United States Patent
Kang et al.

(10) Patent No.: US 11,844,088 B2
(45) Date of Patent: *Dec. 12, 2023

(54) METHOD FOR RECEIVING DOWNLINK CHANNEL IN WIRELESS COMMUNICATION SYSTEM AND DEVICE THEREFOR

(71) Applicant: LG ELECTRONICS INC., Seoul (KR)

(72) Inventors: Jiwon Kang, Seoul (KR); Jonghyun Park, Seoul (KR); Kilbom Lee, Seoul (KR); Minki Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 58 days.

This patent is subject to a terminal disclaimer.

(21) Appl. No.: 17/542,780

(22) Filed: Dec. 6, 2021

(65) Prior Publication Data
US 2022/0095289 A1   Mar. 24, 2022

Related U.S. Application Data

(63) Continuation of application No. 16/614,292, filed as application No. PCT/KR2018/005659 on May 17, 2018, now Pat. No. 11,206,654.

(Continued)

(51) Int. Cl.
*H04W 4/00* (2018.01)
*H04W 72/23* (2023.01)
(Continued)

(52) U.S. Cl.
CPC .......... *H04W 72/23* (2023.01); *H04L 5/0048* (2013.01); *H04W 72/046* (2013.01)

(58) Field of Classification Search
CPC ... H04W 72/23; H04W 72/046; H04W 72/04; H04L 5/0048; H04L 5/00; H04L 5/0023;
(Continued)

(56) References Cited

U.S. PATENT DOCUMENTS 11,206,654 B2 * 12/2021 Kang .................... H04B 7/088
11,277,244 B2 *  3/2022 Gao ...................... H04W 72/23
(Continued)

FOREIGN PATENT DOCUMENTS

| CN | 102916735 | 2/2013 |
| CN | 106341216 | 1/2017 |
| KR | 20150100653 | 9/2015 |

OTHER PUBLICATIONS

ZTE (R1-1700123, beam related indication for DL and UL beam management, Jan. 16-20, 2017) (Year: 2017).*

(Continued)

*Primary Examiner* — Maharishi V Khirodhar
(74) *Attorney, Agent, or Firm* — Fish & Richardson P.C.

(57) ABSTRACT

A method for receiving a downlink channel by a terminal in a wireless communication system and a device therefor. More particularly, a method includes: receiving, from a base station, configuration information relating to a plurality of transmission beams of the base station, wherein the configuration information includes configuration items with respect to one or more beam sets including the plurality of transmission beams; receiving information indicating any one beam set among the one or more beam sets from the base station; and receiving a downlink control channel from the base station based on the indicated beam set, wherein, if the information indicating any one beam set is not received from the base station, the downlink control channel can be received based on a pre-configured beam set among the beam sets.

6 Claims, 14 Drawing Sheets

Related U.S. Application Data

(60) Provisional application No. 62/507,732, filed on May 17, 2017.

(51) Int. Cl.
*H04L 5/00* (2006.01)
*H04W 72/044* (2023.01)

(58) Field of Classification Search
CPC ..... H04L 5/0091; H04B 7/0408; H04B 7/088; H04B 7/12; H04B 7/0695
USPC ........................................................ 370/329
See application file for complete search history.

(56) References Cited

U.S. PATENT DOCUMENTS

| | | | |
|---|---|---|---|
| 2009/0179797 A1 | 7/2009 | Kwon et al. | |
| 2013/0301454 A1 | 11/2013 | Seol et al. | |
| 2018/0220403 A1* | 8/2018 | Wilson et al. | H04B 7/0413 |
| 2019/0313273 A1 | 10/2019 | Sharma et al. | |
| 2020/0169896 A1 | 5/2020 | Li et al. | |

OTHER PUBLICATIONS

ZTE (R1-1700140, QCL/QCB design for DL MIMO) (Year: 2017).*
Catt, "Details of downlink beam management," R1-1704551, 3GPP TSG RAN WG1 Meeting #88bis, Spokane, USA, Apr. 2017, 8 pages.
EP Extended European Search Report in European Appln. No. 18801444.3, dated Dec. 21, 2020, 9 pages.
Ericsson, "Beam management details," R1-1705891, 3GPP TSG-RAN WG1 #88bis, Spokane, WA, USA, Apr. 2017, 5 pages.
Ericsson, "On group-based reporting of Tx beams," R1-1702675, 3GPP TSG-RAN WG1 #88, Athens, Greece, Feb. 2017, 5 pages.
KR Office Action in Korean Appln. No. 10-2019-7033341, dated Dec. 23, 2020, 13 pages (with English translation).
LG Electronics, "Discussion on DL beam management," R1-1707604, 3GPP TSG RAN WG1 Meeting #89, Hangzhou, China, dated May 15-19, 2017, 7 pages.
Nokia, "On beam grouping and reporting," R1-1705959, 3GPP TSG-RAN WG1 Meeting #88bis, Spokane, WA, USA, Apr. 2017, 12 pages.
ZTE (R1-1704398, Discussion on DL beam management, Spokane, USA Apr. 3-7, 2017) (Year: 2017).
ZTE, "Discussion on DL beam management," R1-1707119, 3GPP TSG RAN WG1 Meeting #89, Hangzhou, P.R. China, dated May 15-19, 2017, 12 pages.
Office Action in Chinese Appln. No. 201880032912.3, dated Aug. 23, 2022, 16 pages (with English translation).
Ericsson, "Remaining details of beam management," R1-1721366, Presented at 3GPP TSG-RAN WG1 #91, Reno, USA, November 27-Dec. 1, 2017, 16 pages.
Office Action in European Appln. No. 18801444.3, dated Jul. 13, 2022, 7 pages.

* cited by examiner

METHOD FOR RECEIVING DOWNLINK CHANNEL IN WIRELESS COMMUNICATION SYSTEM AND DEVICE THEREFOR

CROSS-REFERENCE TO RELATED APPLICATIONS

This application is a Continuation Application of U.S. application Ser. No. 16/614,292, filed on Nov. 15, 2019, which is a National Stage application under 35 U.S.C. § 371 of International Application No. PCT/KR2018/005659, filed on May 17, 2018, which claims the benefit of U.S. Provisional Application No. 62/507,732, filed on May 17, 2017. The disclosures of the prior applications are incorporated by reference in their entirety.

TECHNICAL FIELD

The present Disclosure relates to a wireless communication system and, more particularly, to a method of receiving, by a terminal, a downlink channel from a base station in a wireless communication system and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY

The present disclosure proposes a method of receiving a downlink channel by a terminal in a wireless communication system.

Specifically, the present disclosure proposes a method of transmitting, by a base station, information indicating a transmission beam to a terminal in order to perform a beam scanning operation between the terminal and the base station To this end, the present disclosure proposes a method using a preamble or a specific physical channel as information indicating a transmission beam.

Furthermore, the present disclosure proposes a method of grouping the transmission beams of a base station into a plurality of beam sets if the number of transmission beams to be indicated is many and allocating a specific resource region to each beam set.

Furthermore, when a terminal does not receive a beam set for receiving a downlink channel from a base station, the present disclosure proposes a method for configuring the terminal to receive the downlink channel through a pre-configured beam set.

Technical objects to be achieved in the present disclosure are not limited to the above-described technical objects, and other technical objects not described above may be evidently understood by a person having ordinary skill in the art to which the present disclosure pertains from the following description.

A method of receiving a downlink channel by a terminal in a wireless communication system according to an embodiment of the present disclosure, the method includes receiving, from a base station, configuration information for a plurality of transmission beams of the base station, wherein the configuration information includes configurations for one or more beam sets comprised of the plurality of transmission beams, receiving, from the base station, information indicating one beam set of the one or more beam sets, and receiving, from the base station, a downlink control channel through the indicated beam set, wherein when the information indicating one beam set is not received from the base station, the downlink control channel is received through a pre-configured beam set of the one or more beam sets.

In addition, in the method according to an embodiment of the present disclosure, the pre-configured beam set may be a beam set corresponding to a first index among one or more indices representing each of the one or more beam sets.

In addition, in the method according to an embodiment of the present disclosure, information representing the pre-configured beam set may be included in the configuration information.

In addition, in the method according to an embodiment of the present disclosure, the configuration information for the plurality of transmission beams of the base station may be received through Radio Resource Control layer Signaling, and the information indicating one beam set may be received through Medium Access Control (MAC) layer signaling.

In addition, in the method according to an embodiment of the present disclosure, the configurations for one or more beam sets may be configured using Quasi-co-location (QCL) information based on an antenna port. In this case, the QCL information may be configured based on a QCL between a Channel State Information-Reference Signal (CSI-RS) and a Demodulation Reference Signal (DMRS) of the downlink control channel. Alternatively, the QCL information may be configured based on a QCL between a Synchronization Signal (SS) Block and a Demodulation Reference Signal (DMRS) of the downlink control channel.

In addition, in the method according to an embodiment of the present disclosure, the one or more beam sets may be mapped to each of one or more resource sets configured for the downlink control channel.

A terminal for receiving a downlink channel in a wireless communication system according to an embodiment of the present disclosure, the terminal includes a transceiver for transmitting and receiving a radio signal, and a processor functionally connected to the transceiver, wherein the processor is configured to control to receive, from a base station, configuration information for a plurality of transmission beams of the base station, wherein the configuration information includes configurations for one or more beam sets comprised of the plurality of transmission beams, receive, from the base station, information indicating one beam set of the one or more beam sets, and receive, from the base station, a downlink control channel through the indicated beam set, wherein when the information indicating one beam set is not received from the base station, the downlink control channel is received through a pre-configured beam set of the one or more beam sets.

In addition, in the terminal according to an embodiment of the present disclosure, the pre-configured beam set may be a beam set corresponding to a first index among one or more indices representing each of the one or more beam sets.

In addition, in the terminal according to an embodiment of the present disclosure, information representing the pre-configured beam set may be included in the configuration information.

In addition, in the terminal according to an embodiment of the present disclosure, the configuration information for the plurality of transmission beams of the base station may be received through Radio Resource Control layer Signaling, and the information indicating one beam set may be received through Medium Access Control (MAC) layer signaling.

In addition, in the terminal according to an embodiment of the present disclosure, the configurations for one or more beam sets may be configured using Quasi-co-location (QCL) information based on an antenna port. In this case, the QCL information may be configured based on a QCL between a Channel State Information-Reference Signal (CSI-RS) and a Demodulation Reference Signal (DMRS) of the downlink control channel. Alternatively, the QCL information may be configured based on a QCL between a Synchronization Signal (SS) Block and a Demodulation Reference Signal (DMRS) of the downlink control channel.

In accordance with an embodiment of the present disclosure, a transmission and reception operation on a signal and/or a channel can be efficiently performed using an optimal transmission and reception beam pair determined through a beam scanning operation between a terminal and a base station.

Furthermore, in accordance with an embodiment of the present disclosure, the number of bits necessary for information forwarding can be minimized because a base station transmits indication information for a beam stage by stage.

Furthermore, in accordance with an embodiment of the present disclosure, overhead for the downlink control channel reception of a terminal can be reduced because the terminal monitors only a specific region in order to receive the downlink control channel.

Furthermore, in accordance with an embodiment of the present disclosure, a base station can transmit downlink control channels at the same time using one or more frequencies because a resource region for a transmission beam set is allocated according to a frequency division multiplexing method.

Furthermore, according to an embodiment of the present disclosure, even if a terminal does not receive a beam set for receiving a downlink channel from a base station, since the downlink channel is received through a pre-configured beam set, ambiguity for beam selection of the terminal for receiving the downlink channel may be removed.

Effects which may be obtained in the present disclosure are not limited to the above-described effects, and other technical effects not described above may be evidently understood by a person having ordinary skill in the art to which the present disclosure pertains from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

DETAILED DESCRIPTION

Figure 1:
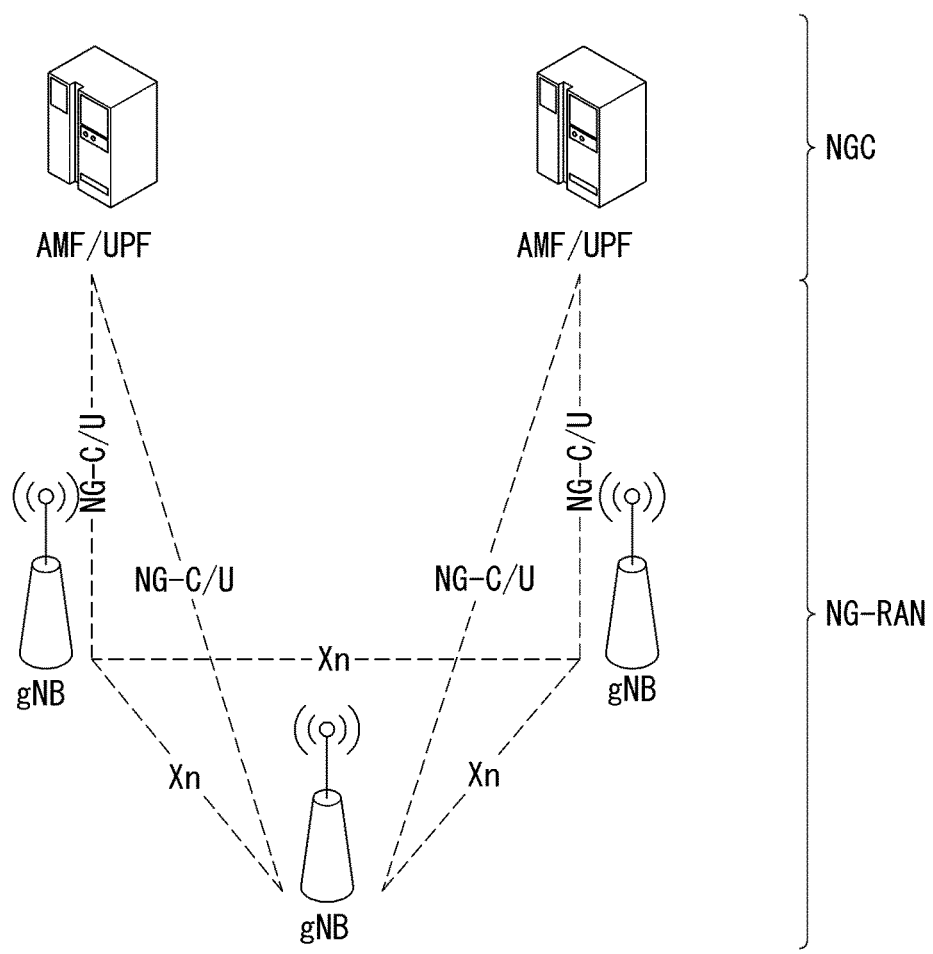
FIG. 1 is a diagram showing an example of a general system structure of NR to which a method proposed in this specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an evolved-NodeB (eNB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UNITS (E-UMTS) using evolved UNITS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by standard documents disclosed in at least one of IEEE 802, 3GPP and 3G PP2, that is, radio access systems. That is, steps or parts not described in order to clearly explain the technical spirit of the present invention in the embodiments of the present disclosure may be supported by the documents. Furthermore, all terms disclosed in this document may be described by the standard documents.

In order to clarity the description, a 3GPP LTE/LTE-A/new RAT (NR) system is basically described, but the technical characteristics of the present invention are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR(New Rat) Numerologies and Frame Structure

In the NR, a plurality of numerologies is supported.

The numerology is defined by a subcarrier spacing and CP overhead. A plurality of subcarrier spacings may be derived by scaling a basic subcarrier spacing with an integer N.

Although a used numerology is assumed to not use a very low subcarrier spacing in a very high carrier frequency, it may be selected independently of a frequency band.

A flexible network and UE channel bandwidth are supported.

In the RAN1 spec. viewpoint, a maximum channel bandwidth per NR carrier is 400 MHz.

In the case of at least one numerology, candidates corresponding to a maximum number of subcarriers per NR carrier are 3300 or 6600 in the RAN1 spec. viewpoint.

Subframe duration is fixed to 1 ms, and a frame length is 10 ms.

A scalable numerology needs to permit a subcarrier spacing of at least 15 kHz~480 kHz.

All numerologies having a large subcarrier spacing of 15 kHz or more regardless of CP overhead are arranged in a symbol bound every 1 ms of an NR carrier.

More specifically, normal CP series are selected as follows.

If a subcarrier spacing is 15 kHz*2n (n is an integer not a negative number),

Each symbol length (including a CP) of a 15 kHz subcarrier spacing is the same as the sum of 2n symbols corresponding to a scaled subcarrier spacing.

All OFDM symbols within 0.5 ms other than the first OFDM symbol has the same size every 0.5 ms.

The first OFDM symbol within 0.5 ms is 16 Ts (15 kHz and an FFT size of 2048 are assumed) longer than other OFDM symbols.

16 Ts are used in a CP for the first symbol.

If a subcarrier spacing is 15 kHz*2n (n is a negative integer)

Each symbol length (including a CP) of a subcarrier spacing is the same as the sum of corresponding 2n symbols of 15 kHz.

A resource defined by one subcarrier and one symbol is called a resource element (RE).

A physical layer design supports an extended CP.

An extended CP is only one in a given subcarrier spacing. An LTE-scaled extended CP is supported in at least 60 kHz subcarrier spacing. A CP type may be semi-statically configured using UE-specific signaling.

A UE supporting an extended CP may depend on a UE type/capability.

The number of subcarriers per PRB is 12.

An explicit DC subcarrier has not been reserved with respect to both the downlink and uplink.

The DC processing of a DC subcarrier on the transmitter side is regulated as follows with respect to DC present within a transmitter:

A receiver needs to be aware of where a DC subcarrier is located or it is known where a DC subcarrier is located (by spec. or signaling) or whether a DC subcarrier is not present within a receiver bandwidth.

With respect to the downlink, a UE may assume that a DC subcarrier transmitted by the transmitter (gNB) side has been modulated. That is, data is not rate-matched or not punctured.

In the case of the uplink, a DC subcarrier transmitted by the transmitter (UE) side is modulated. That is, data is not rate-matched or not punctured.

In the case of the uplink, if a transmitter DC subcarrier on the transmitter (UE) side is possible, a collision with at least DMRS needs to be avoided.

With respect to the uplink, at least one specific subcarrier needs to be defined as the candidate location of a DC subcarrier. For example, the DC subcarrier is located at the bound of a PRB.

In the case of the uplink, means by which a receiver determines a DC subcarrier location needs to be designated.

This is associated with a DC subcarrier location written in semi-static signaling from a UE and the standard.

If a DC subcarrier is not present, all subcarriers within a receiver bandwidth are transmitted.

In contrast, special handling of a DC subcarrier in the RAN1 has not been regulated on the receiver side, and an operation thereof remains as an implementation. That is, the receiver may puncture data received in the DC subcarrier, for example.

A slot is defined as 7 or 14 OFDM symbols with respect to the same subcarrier spacing up to 60 kHz having a normal CP and as 14 OFDM symbols at the same subcarrier spacing higher than 60 kHz having a normal CP.

A slot may include all downlinks, all uplinks or {at least one downlink part and at least one uplink part}.

A slot set is supported. That is, data transmission may be scaled as one or a plurality of slot intervals.

A mini-slot having the following length is defined.

a mini-slot having at least 6 GHz or more, length 1 symbol is supported.

Lengths from a length 2 to a slot length −1

In the case of URLLC, minimum two are supported.

Upon designing the slot level channel/signal/procedure, the following contents need to be taken into consideration.

A possible occurrence of a mini-slot/slot transmission(s) occupying resources scheduled for an ongoing slot transmission(s) of a given carrier with respect to the same/different UEs At least one of a DMRS format/structure/configuration for a slot level data channel is reused for a mini-slot level data channel.

At least one of a DL control channel format/structure/configuration for slot level data scheduling is designed to be applicable to mini-slot level data scheduling.

At least one of an UL control channel format/structure/configuration for slot level UCI feedback is designed to be applicable to mini-slot level UCI feedback.

The following use cases for designing a mini-slot need to be taken into consideration.

Support of a very low latency time including URLLC for a specific slot length

A target slot length is a minimum of 1 ms, 0.5 ms.

In particular, if a TRP uses beam-sweeping (e.g., 6 GHz or more), a finer TDM unit (granularity) for the same or different UEs within a slot is supported.

NR-LTE co-existence

Forward compatibility for a non-licensed spectrum operation

Beam Management

In the NR, beam management is defined as follows.

Beam management: a set of L1/L2 procedures for acquiring and maintaining a set of TRP(s) that may be used for DL and UL transmission and reception and/or UE beams, and includes at least the following contents:

Beam determination: an operation of selecting its own transmission/reception beam by a TRP(s) or a UE.

Beam measurement: an operation of measuring the characteristics of a received beamforming signal by a TRP(s) or a UE.

Beam reporting: an operation of reporting information of a beamformed signal by a UE based on beam measurement.

Beam sweeping: an operation of covering a space region using a beam transmitted and/or received during a time interval according to a predetermined method.

Furthermore, a Tx/Rx beam correspondence in a TRP and a UE is defined as follows.

A Tx/Rx beam correspondence in a TRP is maintained when at least one of the followings is satisfied.

A TRP may determine a TRP reception beam for an uplink reception based on the downlink measurement of a UE for one or more transmission beams of the TRP.

A TRP may determine a TRP Tx beam for downlink transmission based on the uplink measurement of the TRP for one or more Rx beams of the TRP.

A Tx/Rx beam correspondence in a UE is maintained when at least one of the followings is satisfied.

A UE may determine a UE Tx beam for uplink transmission based on the downlink measurement of the UE for the one or more Rx beams of the UE.

A UE may determine a UE reception beam for downlink reception on the basis of the indication of a TRP based on uplink measurement for one or more Tx beams.

The capability indication of UE beam correspondence-related information is supported for a TRP.

The following DL L1/L2 beam management procedure is supported within one or a plurality of TRPs.

P-1: this is used to make possible UE measurement for different TRP Tx beams in order to support the selection of a TRP Tx beam/UE Rx beam(s).

In general, beamforming in a TRP includes intra/inter-TRP Tx beam sweep in different beam sets. For beamforming in a UE, in general, this includes UE Rx beam sweep from different sets of beams.

P-2: this is used so that UE measurement for different TRP Tx beams changes an inter/intra-TRP Tx beam(s).

P-3: UE measurement for the same TRP Tx beam is used to change a UE Rx beam if a UE uses beamforming.

Aperiodic reporting triggered by at least network is supported in the P-1, P-2 and P-3-related operation.

UE measurement based on an RS for beam management (at least CSI-RS) is configured with K (total number of beams) beam. A UE reports the measured results of selected N Tx beams. In this case, N is essentially not a fixed number. A procedure based on an RS for a mobility object is not excluded. Report information includes information indicating measurement quantity for an N beam(s) and N DL transmission beam if at least N<K. In particular, a UE may report a CSI-RS resource indicator (CRI) of N' with respect to K'>1 non-zero-power (NZP) CSI-RS resources.

A UE may be configured as the following higher layer parameters for beam management.

N≥1 reporting setting, M≥1 resource configuration

Links between reporting setting and resource configurations are established in an agreed CSI measurement configuration.

CSI-RS-based P-1 and P-2 are supported as resource and reporting setting.

P-3 may be supported regardless of whether reporting setting is present.

Reporting setting including at least the following contents

Information indicating a selected beam

L1 measurement reporting

A time domain operation (e.g., aperiodic operation, periodic operation, semi-persistent operation)

Frequency granularity when several frequency granularities are supported

Resource setting including at least the following contents

Time domain operation (e.g., aperiodic operation, periodic operation, semi-persistent operation)

RS type: at least NZP CSI-RS

At least one CSI-RS resource set. Each CSI-RS resource set includes K≥1 CSI-RS resources (some parameters of K CSI-RS resources may be the same. For example, a port number, a time domain operation, density and a period)

Furthermore, NR supports the following beam reporting by taking into consideration L groups, that is, L>1.

Information indicating a minimum group

Measurement quantity for an N1 beam (L1 RSRP and CSI reporting support (if a CSI-RS is for CSI acquisition))

If applicable, information indicating NI DL transmission beams

Group-based beam reporting, such as that described above, may be configured in a UE unit. Furthermore, the group-based beam reporting may be turned off in a UE unit (e.g., when L=1 or Nl=1).

The NR supports that a UE can trigger a mechanism recovering from a beam failure.

A beam failure event occurs when quality of a beam pair link of associated control channels is sufficiently low (e.g., a comparison with a threshold, the timeout of an associated timer). The mechanism recovering from a beam failure (or blockage) is triggered when beam blockage occurs.

A network explicitly configures a UE having a resource for transmitting an UL signal for the purpose of recovery. The configuration of the resources is supported in the place where a base station listens in all or some directions (e.g., random access region).

An UL transmission/resource reporting beam blockage may be located in a PRACH (resource orthogonal to a PRACH resource) and at the same time instance or a time instance (may be configured for a UE) different from that of a PRACH. The transmission of a DL signal is supported so that a UE can monitor a beam in order to identify new potential beams.

The NR supports beam management regardless of beam-related indication. If the beam-related indication is provided, information regarding a UE-side beamforming/reception procedure used for CSI-RS-based measurement may be indicated through QCL with respect to the UE.

Parameters for delay, Doppler, and an average gain used in the LTE system and a space parameter for beamforming in a receiver are expected to be added as QCL parameters to be supported in the NR. An angle of arrival-related parameter in a terminal reception beamforming viewpoint and/or angle of departure-related parameters in a base station reception beamforming viewpoint may be included.

The NR supports to use the same or different beams in a control channel and corresponding data channel transmission.

For NR-PDCCH transmission supporting robustness for beam pair link blocking, a UE may be configured to monitor an NR-PDCCH on M beam pair links at the same time. In this case, M≥1 and a maximum value of M may depend on at least a UE capability.

A UE may be configured to monitor an NR-PDCCH on a different beam pair link(s) in different NR-PDCCH OFDM symbols. A parameter related to a UE Rx beam configuration for monitoring an NR-PDCCH on a plurality of beam pair links may be configured by higher layer signaling or a MAC CE and/or is taken into consideration in the discovery space design.

At least the NR supports the indication of space QCL assumption between a DL RS antenna port(s) and a DL RS antenna port(s) for the demodulation of a DL control channel. A candidate signaling method for beam indication for an NR-PDCCH (i.e., configuration method of monitoring an NR-PDCCH) is MAC CE signaling, RRC signaling, DCI signaling, a spec. transparent and/or implicit method, and a combination of these signaling methods.

For the reception of a unicast DL data channel, the NR supports the indication of space QCL assumption between a DL RS antenna port and the DMRS antenna port of a DL data channel.

Information indicating an RS antenna port is indicated through DCI (downlink permission). Furthermore, the information indicates an RS antenna port QCLed with a DMRS antenna port. A different set of DMRS antenna ports for a DL data channel may be indicated as QCL with respect to a different set of RS antenna ports.

Hybrid Beamforming

The existing beamforming technology using multiple antennas may be divided into an analog beamforming scheme and a digital beamforming scheme depending on the location where a beamforming weight vector/precoding vector is applied.

The analog beamforming scheme is a beamforming scheme applied to an initial multiple antenna structure. This may mean a scheme for branching an analog signal on which digital signal processing has been completed into a plurality of paths and forming a beam by applying a phase shift (PS) and power amplifier (PA) configuration to each path.

For analog beamforming, there is a need for a structure in which the PA and PS connected to each antenna process an analog signal derived from one digital signal. In other words, the PA and PS of an analog stage process a complex weight.

Figure 2:
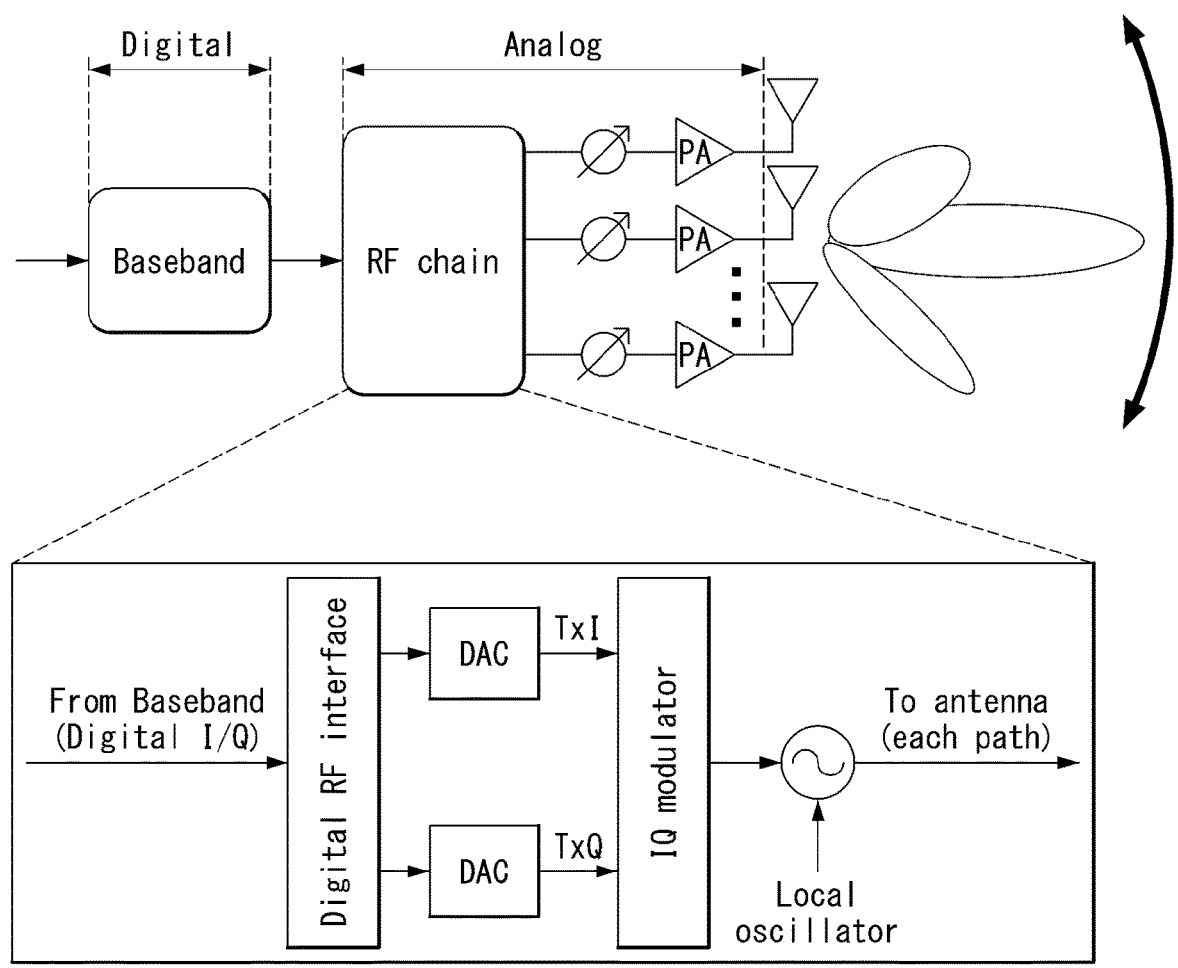
FIG. 2 shows an example of a block diagram of a transmitter configured with an analog beamformer and RF chains.

FIG. 2 shows an example of a block diagram of a transmitter configured with an analog beamformer and RF chains. FIG. 2 is merely for convenience of description and does not limit the range of the present invention.

In FIG. 2, the RF chain means a processing block in which a baseband (BB) signal is converted into an analog signal. In the analog beamforming scheme, the accuracy of a beam is determined depending on the characteristics of a PA and PS. The analog beamforming scheme may be advantageous in narrowband transmission in terms of control of the devices.

Furthermore, the analog beamforming scheme has a relatively small multiplexing gain for a transfer rate increase because it is configured with a hardware structure that is difficult to implement multiple stream transmission. Furthermore, in this case, beamforming for each orthogonal resource allocation-based terminal may not be easy.

In contrast, in the digital beamforming scheme, in order to maximize diversity and a multiplexing gain in a MIMO environment, beamforming is performed in a digital stage using a baseband (BB) process.

Figure 3:
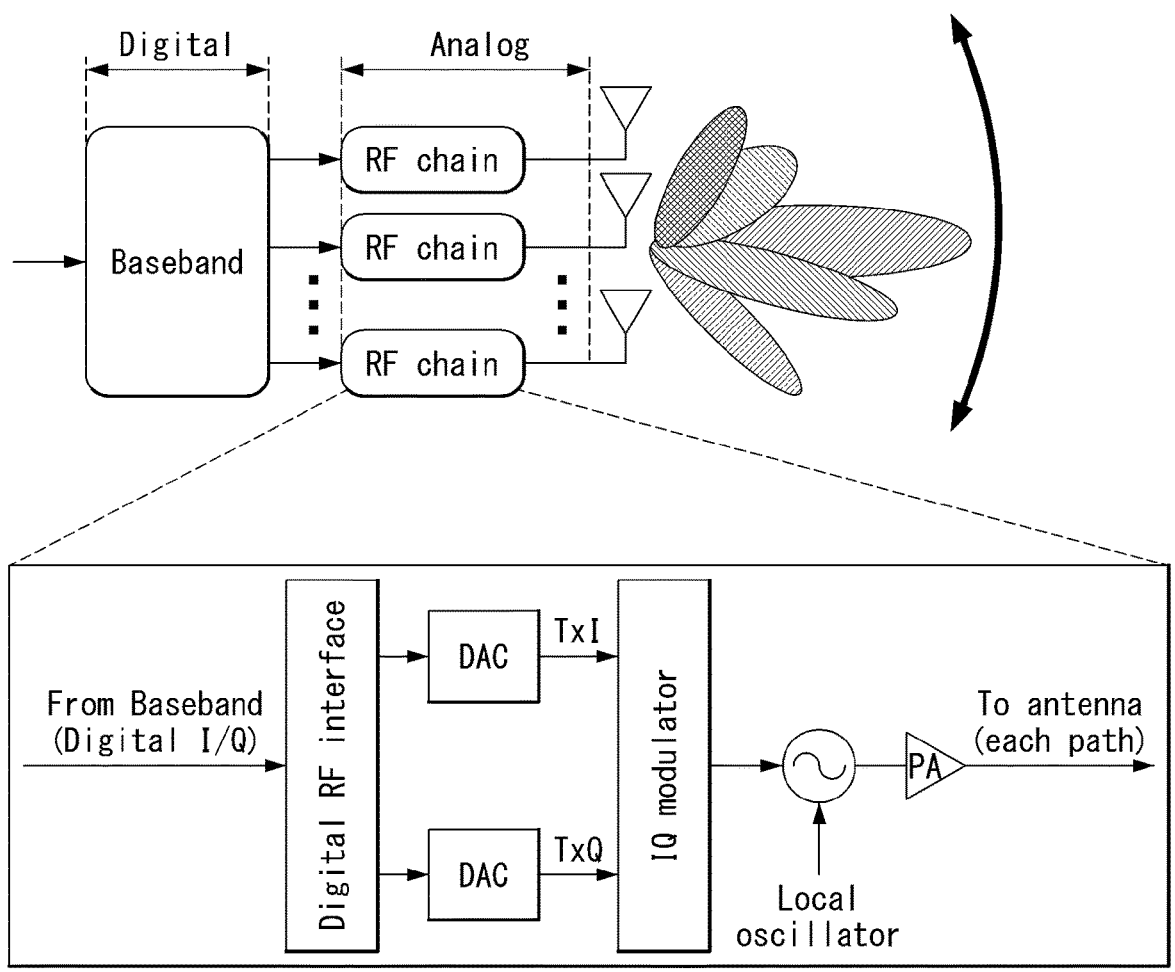
FIG. 3 shows an example of a block diagram of a transmitter configured with a digital beamformer and RF chains.

FIG. 3 shows an example of a block diagram of a transmitter configured with a digital beamformer and RF chains. FIG. 3 is merely for convenience of description and does not limit the range of the present invention.

In the case of FIG. 3, beamforming may be performed as precoding is performed in a BB process. In this case, an RF chain includes a PA. The reason for this is that in the digital beamforming scheme, a complex weight derived for beamforming is directly applied to transmission data.

Furthermore, multiple user beamforming may be supported at the same time because different beamforming may be performed for each terminal. Furthermore, the flexibility of scheduling is improved because independent beamforming is possible for each terminal to which an orthogonal resource has been allocated. Accordingly, an operation of a transmitter complying with a system object is possible. Furthermore, in the environment in which wideband transmission is supported, if a technology, such as MIMO-OFDM, is applied, an independent beam may be formed for each subcarrier.

Accordingly, the digital beamforming scheme can maximize a maximum transfer rate of one terminal (or user) based on a capacity increase of a system and an enhanced beam gain. In the existing 3G/4G (e.g., LTE(-A)) system, the digital beamforming-based MIMO scheme has been introduced based on characteristics, such as those described above.

In an NR system, a massive MIMO environment in which transmission and reception antenna greatly increases may be taken into consideration. In general, in cellular communication, a maximum of transmission and reception antennas applied to the MIMO environment is assumed to be 8. However, as a massive MIMO environment is taken into consideration, the number of transmission and reception antennas may be increased to tens of or hundreds of transmission and reception antennas.

In this case, in the massive MIMO environment, if the above-described digital beamforming technology is applied, a transmitter needs to perform signal processing on hundreds of antennas through a BB process for digital signal processing. Accordingly, the complexity of the signal processing may be greatly increased, and the complexity of a hardware implementation may be greatly increased because RF chains corresponding to the number of antennas are necessary.

Furthermore, the transmitter requires independent channel estimation for all the antennas. Furthermore, in the case of the FDD system, pilot and/or feedback overhead may excessively increase because the transmitter requires feedback information for massive MIMO channels configured with all the antennas.

In contrast, in the massive MIMO environment, if the above-described analog beamforming technology is applied, the hardware complexity of the transmitter is relatively low.

In contrast, an increment of performance using multiple antennas is very small, and the flexibility of resource allocation may be reduced. In particular, upon wideband transmission, to control a beam for each frequency is not easy.

Accordingly, in the massive MIMO environment, only one of the analog beamforming and digital beamforming schemes is not exclusively selected, but a hybrid type transmitter configuration method in which analog beamforming and digital beamforming structures have been combined is necessary.

In this case, a hybrid type transmitter may be configured using the relation between a performance gain and complexity of the analog beamforming scheme and the digital beamforming scheme, such as that shown in Table 1.

TABLE 1

| | beamforming accuracy control easiness | Multiple carrier beam control | Multiple stream transmission | Hardware complexity (BB process) | Pilot and feedback overhead |
|---|---|---|---|---|---|
| Analog beamforming scheme | Low (PA/PS device characteristics and relation) | Impossible or difficult | Impossible or difficult | Low | Low |
| Digital beamforming scheme | High | Possible | Possible | High | High |

That is, a hybrid type transmitter structure capable of reducing the hardware implementation complexity of a transmitter and obtaining a maximum beamforming gain using massive antennas based on the performance gain and complexity relation shown in Table 1 may be taken into consideration (or designed).

Hereinafter, a scheme in which a hybrid type transmitter forms a beam may be called a hybrid beamforming (scheme).

Hybrid Beamforming System Model

Figure 4:
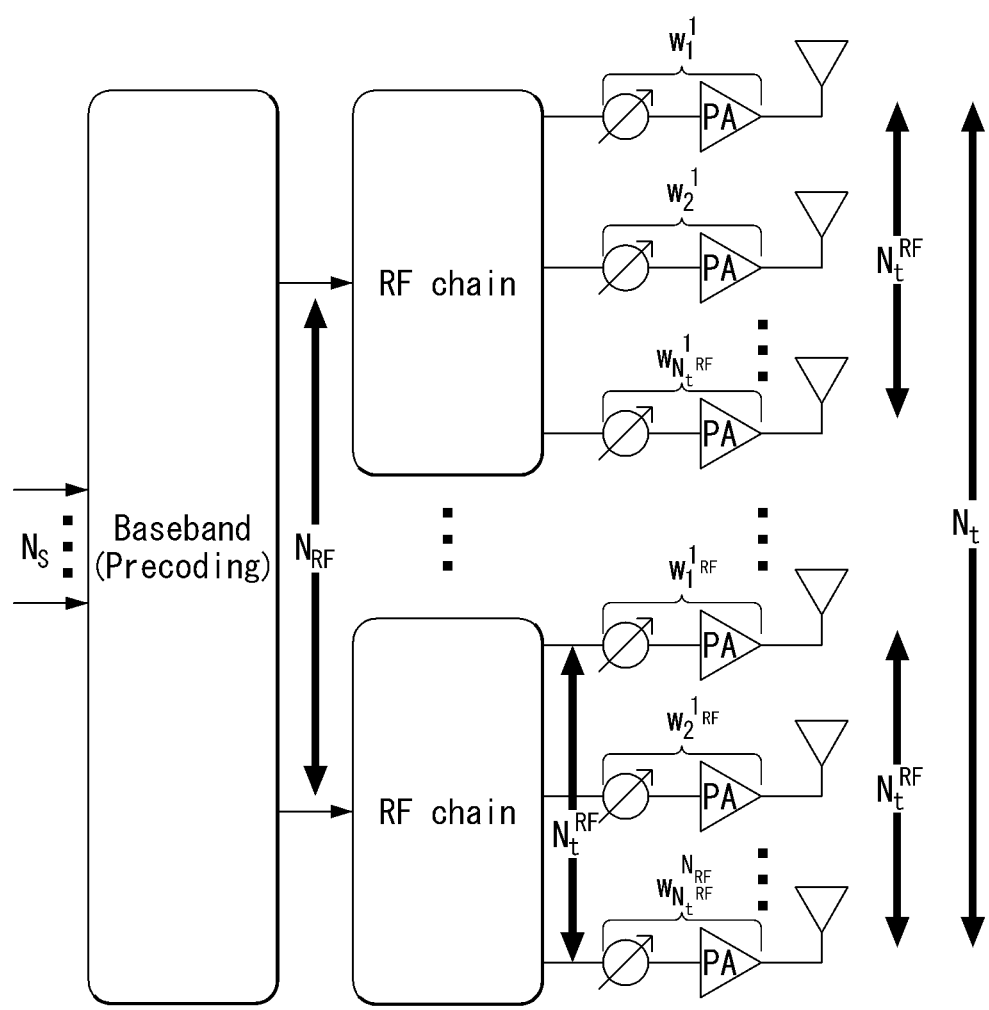
FIG. 4 shows an example of a transmitter structure of hybrid beamforming according to various embodiments of the present disclosure.

A basic hybrid beamformer (transmitter) may be configured as a transmitter structure having $N_t^{RF}$ independent antennas for each RF chain as in FIG. 4.

FIG. 4 shows an example of a transmitter structure of hybrid beamforming according to various embodiments of the present invention. FIG. 4 is merely for convenience of description and does not limit the range of the present invention.

Referring to FIG. 4, Ns is the number of transmission data streams, NRF is a total number of RF chains, $N_t^{RF}$ is the number of transmission antennas for each RF chain, Nt is a total number of antennas of a transmitter, and Nr is a total number of antennas of a receiver.

In this case, a relation, such as Equation 1, may be established between the total number of antennas Nt and the number of antennas for each RF chain $N_t^{RF}$.

$$N_t = N_t^{RF} \times N_{RF} \qquad \text{[Equation 1]}$$

In this case, a system model of a matrix type, such as Equation 2, may be taken into consideration because signals passing through a phase shifter (PS) and a power amplifier (PA) for each RF chain are independently transmitted through transmission antennas.

$$y_k = H_k F_k^{RF} F_k^{BB} s_k + z_k$$

In Equation 2, yk means a received signal vector (Nr×1) in a k-th subcarrier. Hk means Nr×Nt channels in the k-th subcarrier. FRF means Nt×Nt RF precoders in all subcarriers. $F_k^{BB}$ means NRF×Ns baseband precoders in the k-th subcarrier. Furthermore, sk means a transmission signal vector (Ns×1) in the k-th subcarrier, and zk means a noise signal vector (Nr×1) in the k-th subcarrier.

In this case, the RF precoder is the same with respect to all the subcarriers, and the baseband precoder may be changed for each subcarrier.

In this case, if Equation 2 is expanded with respect to a subcarrier k, Equation 3 may be derived.

$$\begin{bmatrix} y^{(1)} \\ \vdots \\ y^{(Nr)} \end{bmatrix} = \begin{bmatrix} h_{11} & h_{12} & \cdots & h_{1Nt} \\ h_{21} & h_{22} & \cdots & h_{2Nt} \\ \vdots & \vdots & \ddots & \vdots \\ h_{Nr1} & h_{Nr2} & \cdots & h_{NrNt} \end{bmatrix} \qquad \text{[Equation 3]}$$

$$F^{RF} \left( \begin{bmatrix} v_{1,1} & v_{1,2} & \cdots & v_{N_{RF},N_S} \\ v_{2,2} & v_{2,2} & \cdots & v_{N_{RF},N_S} \\ \vdots & \vdots & \ddots & \vdots \\ v_{N_{RF},1} & v_{N_{RF},2} & \cdots & v_{N_{RF},N_S} \end{bmatrix} \begin{bmatrix} x^{(1)} \\ \vdots \\ x^{(N_S-1)} \end{bmatrix} \right) + \begin{bmatrix} z^{(1)} \\ \vdots \\ z^{(Nr)} \end{bmatrix}$$

In this case, an equivalent precoding matrix FRF (Nt× NRF matrix) of analog beamforming generated by a PS and PA after an RF chain may be represented like Equation 4.

$$F^{RF} = \begin{bmatrix} w_{N_t^{RF}}^1 & 0 & 0 & \cdots & 0 \\ 0 & w_{N_t^{RF}}^2 & 0 & \cdots & 0 \\ 0 & 0 & w_{N_t^{RF}}^3 & \cdots & 0 \\ \vdots & \vdots & \vdots & \ddots & \vdots \\ 0 & 0 & 0 & \cdots & w_{N_t^{RF}}^{N_{RF}} \end{bmatrix} \qquad \text{[Equation 4]}$$

Through Equation 4, a precoding weight for each RF chain of the RF precoding matrix FRF, such as Equation 5, may be calculated.

$$w_{N_t^{RF}}^i = \begin{bmatrix} w_1^j \\ w_2^j \\ \vdots \\ w_{N_t^{RF}}^j \end{bmatrix} \qquad \text{[Equation 5]}$$

Beam Radiation Pattern of Hybrid Beamforming

For hybrid beamforming, a uniform linear array (ULA) antenna may be used. In this case, the array response vector of the ULA antenna is the same as Equation 6.

$$a(\theta) = \left[ 1 \; \exp\left(j2\pi \times 1 \times \frac{d}{\lambda}\sin(\theta)\right) \right. \qquad \text{[Equation 6]}$$
$$\left. \exp\left(j2\pi \times 2 \times \frac{d}{\lambda}\sin(\theta)\right) \ldots \exp\left(j2\pi \times (N_t - 1) \times \frac{d}{\lambda}\sin(\theta)\right) \right]^T$$

In Equation 6, λ means a wave-length, and d means the distance between antennas. Hereinafter, for convenience of description, a case where the number of RF chains configuring a hybrid beamformer is 4 and the number of analog antennas for each RF chain is 4 is assumed. In this case, the hybrid beamformer may be configured like FIG. 5.

Figure 5:
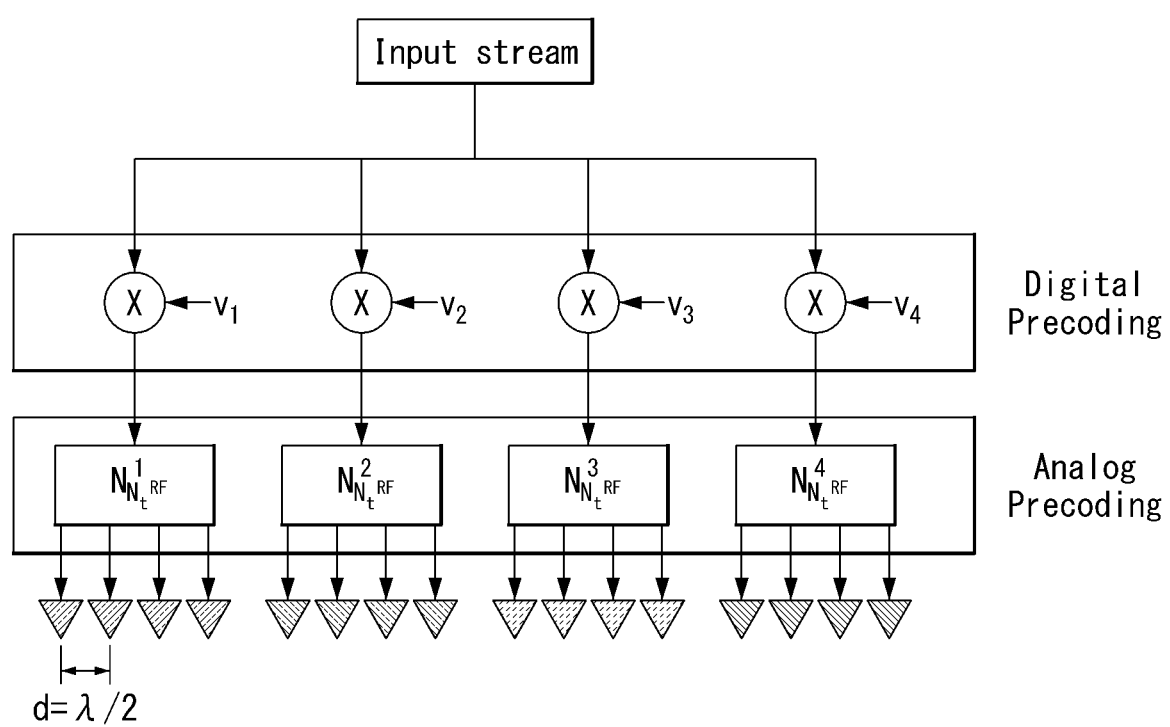
FIG. 5 shows an example of a hybrid beamformer configuration according to various embodiments of the present disclosure.

FIG. 5 shows an example of a hybrid beamformer configuration according to various embodiments of the present invention. FIG. 5 is merely for convenience of description and does not limit the range of the present invention.

Referring to FIG. 5, it is assumed that the hybrid beamformer has a 16-ULA antenna structure configured with 4 RF chains. In this case, a total number of transmission antennas is 16, and d=λ/2 is established. In this case, the phase shifter (PS) and power amplifier (PA) of an analog terminal may be represented as an equivalent beamforming weight, and this is the same as Equation 7.

$$F^{RF} = \begin{bmatrix} w_{N_t^{RF}}^1 & 0 & 0 & 0 \\ 0 & w_{N_t^{RF}}^2 & 0 & 0 \\ 0 & 0 & w_{N_t^{RF}}^3 & 0 \\ 0 & 0 & 0 & w_{N_t^{RF}}^4 \end{bmatrix}, w_{N_t^{RF}}^i = \begin{bmatrix} w_1^i \\ w_2^i \\ w_3^i \\ w_4^i \end{bmatrix} \qquad \text{[Equation 7]}$$

In Equation 7, FRF means an RF precoder.

In order to derive a beam pattern in a reference direction (boresight), the shift angle of a beam may be set to 0°. Accordingly, the elements of all weight vectors of an analog precoding matrix become 1. In this case, a given rank-1 weight vector to be applied in a digital beamforming stage may be defined like Equation 8.

$$F^{BB} = v_1 = [v_1 v_2 v_3 v_4]^T \qquad \text{[Equation 8]}$$

In the reference direction (i.e., θ=0°), all antenna array response vectors to which the beamforming of Equation 7 has been applied may be represented like Equation 9. In this case, the distance d between the antennas is assumed to be λ/2. A response to each antenna array response may be represented as the sum of all vector elements.

$$\sum a(\theta) = \sum_{i=0}^{15} a_i(\theta) = \quad \text{[Equation 9]}$$

$(1 + \exp(j\pi \times \sin(\theta)) + \exp(j\pi 2 \times \sin(\theta)) + \exp(j\pi 3 \times \sin(\theta))) \times$ $v_1 +$ $(\exp(j\pi 4 \times \sin(\theta)) + \exp(j\pi 5 \times \sin(\theta)) +$ $\exp(j\pi 6 \times \sin(\theta)) + \exp(j\pi 7 \times \sin(\theta))) \times v_2 +$ $(\exp(j\pi 8 \times \sin(\theta)) + \exp(j\pi 9 \times \sin(\theta)) +$ $\exp(j\pi 10 \times \sin(\theta)) + \exp(j\pi 11 \times \sin(\theta))) \times v_3 +$ $(\exp(j\pi 12 \times \sin(\theta)) + \exp(j\pi 13 \times \sin(\theta)) +$ $\exp(j\pi 14 \times \sin(\theta)) + \exp(j\pi 15 \times \sin(\theta))) \times v_4$ If Equation 9 is arranged, the results of Equation 10 may be obtained.

$$\sum a(\theta) = \quad \text{[Equation 10]}$$

$(1 + \exp(j\pi\sin(\theta)) + \exp(j\pi 2\sin(\theta)) + \exp(j\pi 3\sin(\theta))) \times$ $(v_1 + \exp(j\pi 4\sin(\theta)) \cdot v_2 + \exp(j\pi 8\sin(\theta)) \cdot v_3 +$ $\exp(j\pi 12\sin(\theta)) \cdot v_4) = \left(\sum_{i=1}^{4} s_i\right) \times \left(\sum_{i=1}^{4} t_i\right) = \sum s \times \sum t$ In Equation 10, s means a beam bound vector, and t means a beam gain and a steering vector. In this case, the s and the t may be represented like Equation 11 and Equation 12, respectively.

$$s = \begin{bmatrix} 1 \\ e^{j\pi\sin(\theta)} \\ e^{j\pi 2\sin(\theta)} \\ e^{j\pi 3\sin(\theta)} \end{bmatrix} \quad \text{[Equation 11]}$$

$$t = \begin{bmatrix} 1 & 0 & 0 & 0 \\ 0 & e^{j\pi 4\sin(\theta)} & 0 & 0 \\ 0 & 0 & e^{j\pi 8\sin(\theta)} & 0 \\ 0 & 0 & 0 & e^{j\pi 12\sin(\theta)} \end{bmatrix} \begin{bmatrix} v_1 \\ v_2 \\ v_3 \\ v_4 \end{bmatrix} \quad \text{[Equation 12]}$$

In this case, the beam bound vector s may determine a total valid range of a beam. Furthermore, the range of digital beamforming may be limited within a corresponding region. The vector s and the vector t may be represented like FIG. 6.

Figure 6:
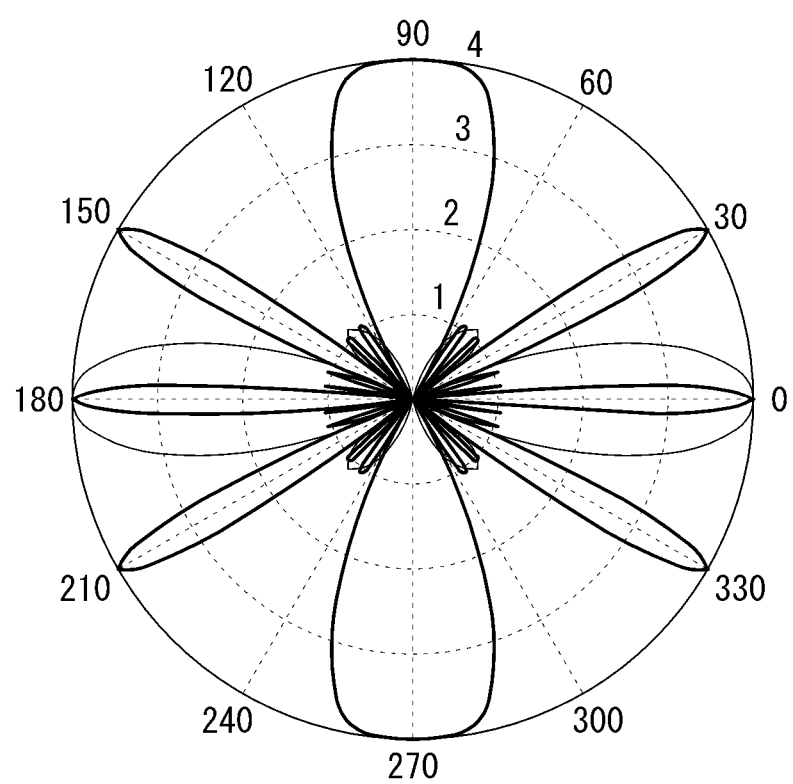
FIG. 6 shows a beam bound vector and a beam gain/steering vector according to various embodiments of the present disclosure.

FIG. 6 shows a beam bound vector and a beam gain/steering vector according to various embodiments of the present invention. FIG. 6 is merely for convenience of description and does not limit the range of the present invention.

Figure 7:
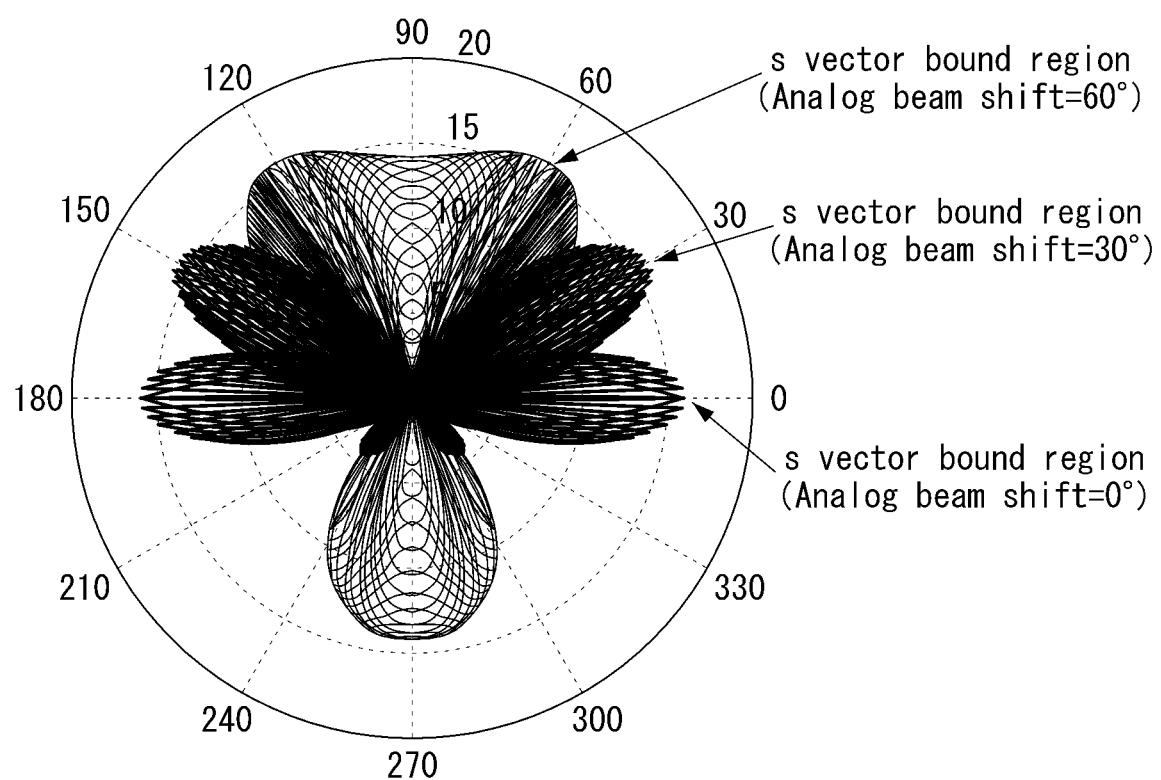
FIG. 7 shows an accumulated beam pattern to which analog beamforming and digital beamforming is applied according to various embodiments of the present disclosure.

Furthermore, finally, an accumulated beam pattern result to which the vector of Equation 8 for determining digital beamforming has been applied may be represented like FIG. 7.

FIG. 7 shows an accumulated beam pattern to which analog beamforming and digital beamforming is applied according to various embodiments of the present invention. FIG. 7 is merely for convenience of description and does not limit the range of the present invention.

From FIG. 7, it may be seen that the valid range of a beam is determined based on the beam bound vector s shown in FIG. 6.

In the above-described part, a system model and radiation pattern in which one RF chain is mapped to some sub-arrays and analog beam coefficients applied to a corresponding sub-array are the same have been described. However, in the hybrid beamforming structure, mapping between various types of RF chains and antenna arrays in addition to the example may be taken into consideration. A method of configuring an analog beam coefficient may be taken into consideration in various ways.

Analog Beam Scanning

In general, analog beamforming may be used in a pure analog beamforming transmitter and receiver and a hybrid beamforming transmitter and receiver. In this case, analog beam scanning may perform estimation on one beam at the same time. Accordingly, a beam training time necessary for beam scanning is proportional to a total number of candidate beams.

As described above, in the case of analog beamforming, a beam scanning process in the time domain is essentially necessary for transmitter and receiver beam estimation. In this case, an estimation time Ts for all transmission and reception beams may be represented like Equation 1.

$$T_S = t_s \times (K_T \times K_R) \quad \text{[Equation 13]}$$

In Equation 13, ts means a time necessary for one beam scanning, KT means the number of transmission beams, and KR means the number of reception beams.

Figure 8:
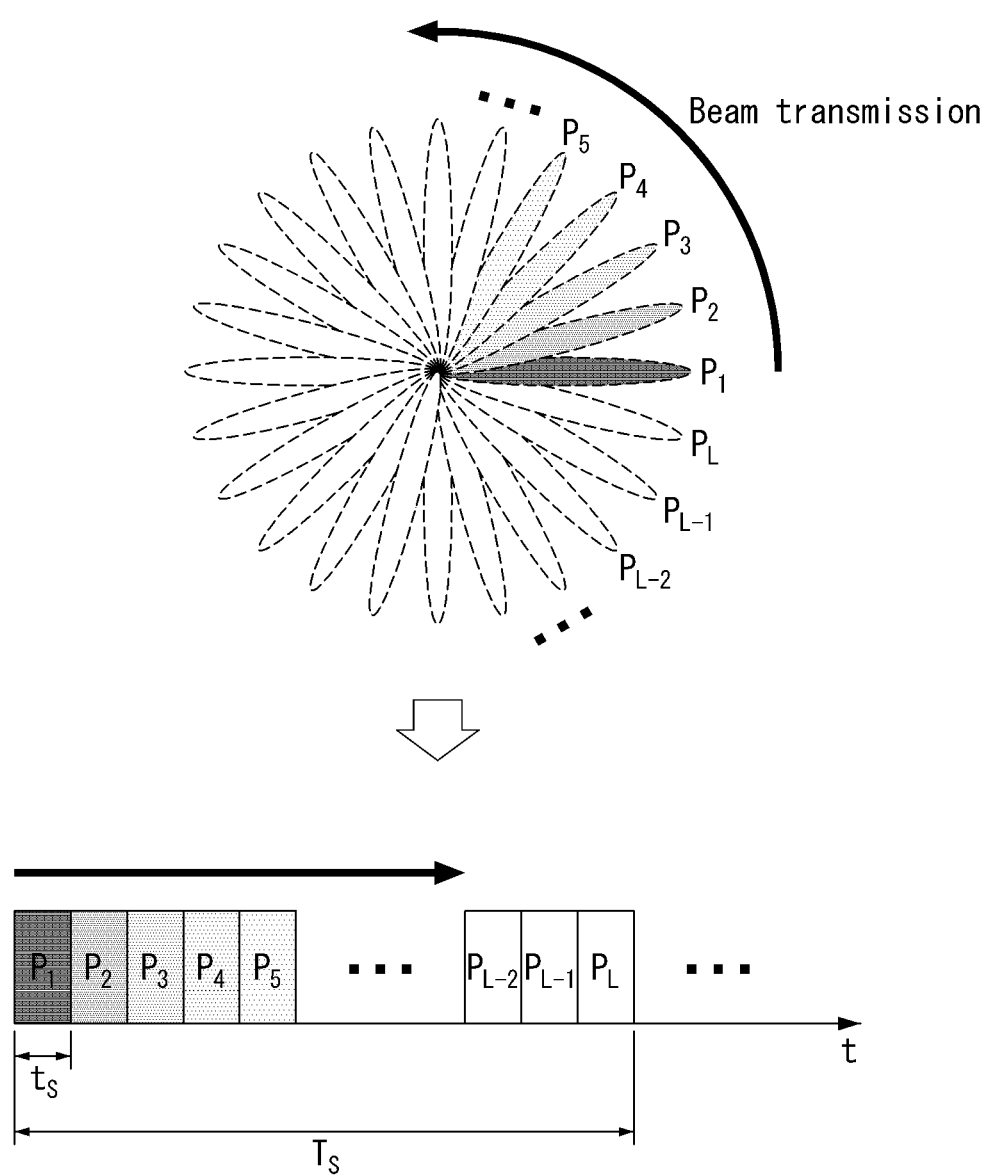
FIG. 8 shows examples of analog beam scanning methods according to various embodiments of the present disclosure.

FIG. 8 shows examples of analog beam scanning methods according to various embodiments of the present invention. FIG. 8 is merely for convenience of description and does not limit the range of the present invention.

In the case of FIG. 8, it is assumed that a total number of transmission beams KT is L and a total number of reception beams KR is 1. In this case, a total number of candidate beams is L, and thus an L time interval is necessary in the time domain.

In other words, for analog beam estimation, only one beam estimation may be performed in one time interval. As shown in FIG. 8, an L time interval is necessary to perform all L beams (P1 to PL) estimation. After an analog beam estimation procedure is terminated, a terminal feeds the identification (e.g., ID) of a beam having the highest signal intensity back to a base station. That is, a longer training time may be necessary as the number of beams increases according to an increase in the number of transmission and reception antennas.

In analog beamforming, a training interval for an individual beam needs to be guaranteed unlike in digital beamforming because the size of a continuous waveform in a time domain and a phase angle are changed after a digital-to-analog converter (DAC). Accordingly, as the length of the training interval increases, efficiency of a system may be reduced (i.e., a loss of a system may be increased).

As described above, if both a base station and a terminal perform analog beamforming, for downlink transmission, the base station needs to perform an analog beam scanning operation for a transmission beam configuration, and the terminal needs to perform an analog beam scanning operation for a reception beam configuration.

Figure 9:
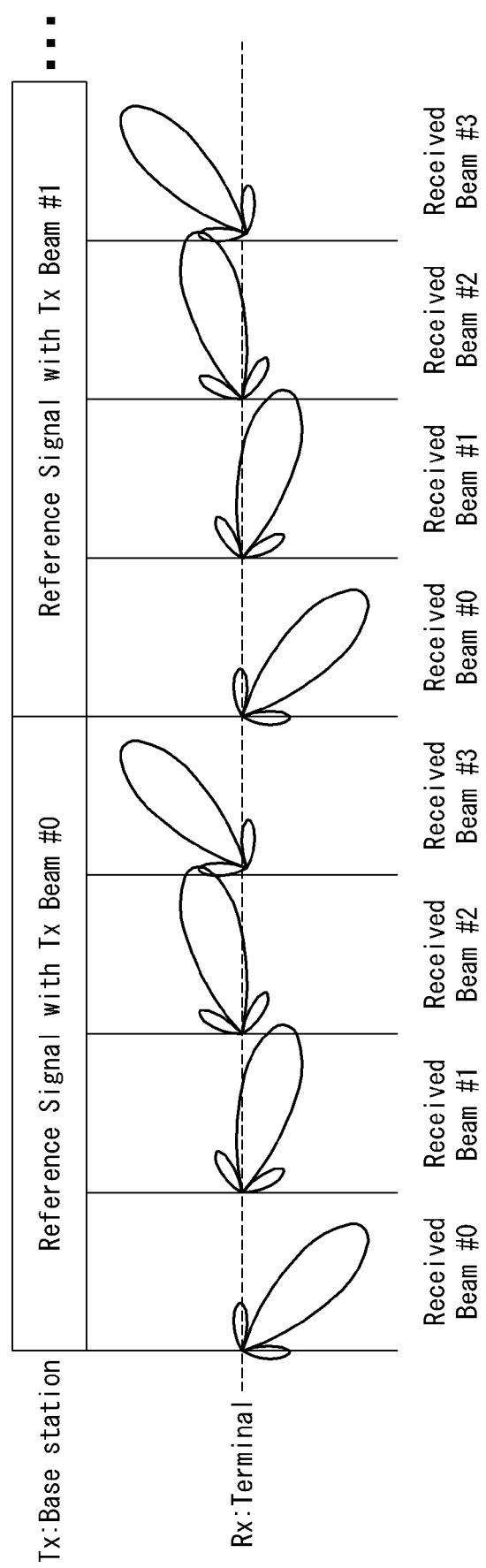
FIG. 9 shows examples of transmission/reception beam scanning operations according to various embodiments of the present disclosure.

FIG. 9 shows examples of transmission/reception beam scanning operations according to various embodiments of the present invention. FIG. 9 is merely for convenience of description and does not limit the range of the present invention.

Referring to FIG. 9, it is assumed that a base station and a terminal perform a beam scanning operation in order to determine an optimal pair of a transmission beam and a reception beam.

Specifically, the base station transmits a preamble (e.g., reference signal, pilot signal) for a plurality of transmission (Tx) candidate beams (or candidate transmission (Tx) beam(s)). Accordingly, the terminal may identify an optimal pair of a transmission beam and a reception beam by applying a reception (Rx) candidate beam (or candidate reception (Rx) beam(s)). In this case, the terminal needs to notify the base station of information for a transmission beam to be applied by the base station among information for identified transmission/reception beams.

However, a transmission/reception beam pair (Tx/Rx beam pair) between the base station and the terminal identified according to the above-described procedure may be different depending on a movement of the terminal. A change in an optimal transmission beam may occur depending on a movement in the location of the terminal or a change in the blockage environment around the terminal. A change in an optimal reception beam may occur due to a short-term change, such as the rotation of a terminal, in addition to a long-term change. For example, in the case of a handset/handheld terminal, such as a smartphone, if a user moves his or her hand slightly while carrying the terminal, an optimal reception beam needs to be changed because the reference axis of the terminal is changed.

Accordingly, the scanning/tracking operation of a reception beam needs to be frequently performed compared to the scanning/tracking operation of a transmission beam. In other words, if a time limit in which transmission beam scanning/tracking must occur (i.e., is required) is represented as N and a time limit in which reception beam scanning/tracking must occur is represented as M, the relation of M<N may be established.

In this case, in order to satisfy the relation of M<N, a method of transmitting all preamble sets every M, that is, a smaller time of the M and N, may be taken into consideration.

Figure 10:
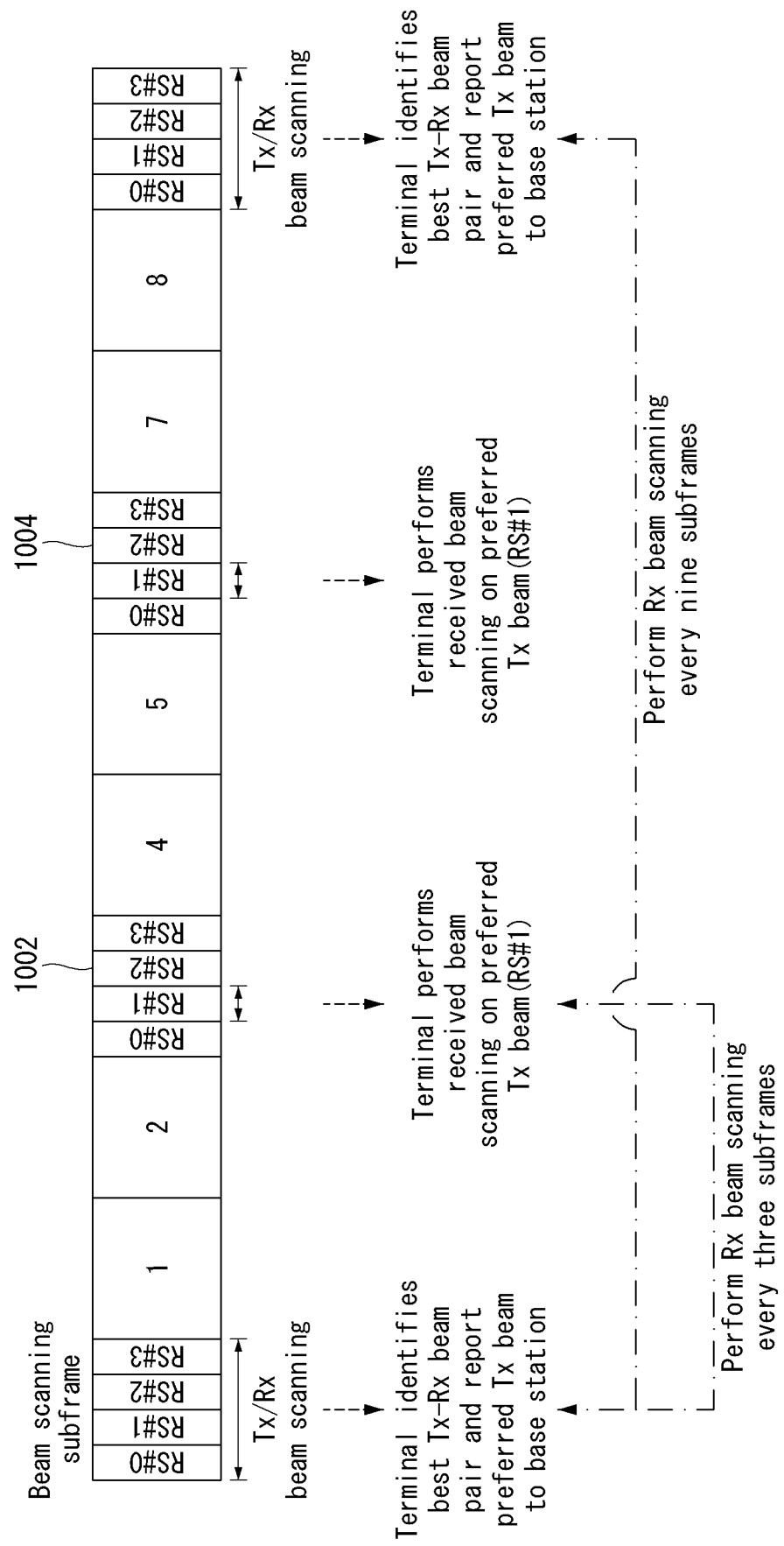
FIG. 10 shows an example of a method of designating a beam scanning subframe according to various embodiments of the present disclosure.

FIG. 10 shows an example of a method of designating a beam scanning subframe according to various embodiments of the present invention. FIG. 10 is merely for convenience of description and does not limit the range of the present invention.

Referring to FIG. 10, a case where a terminal performs only beam scanning on a preferred transmission beam in a No. 3 subframe 1002 and/or a No. 6 subframe 1004 is assumed. The preferred transmission beam is selected every 9 subframes.

In this case, a base station needs to transmit a plurality of preambles in the No. 3 subframe 1002 and/or the No. 6 subframe 1004 because a plurality of terminals may prefer different transmission beams. Accordingly, in the method, a resource in which data can be transmitted in a beam scanning subframe (i.e., Tx-Rx beam scanning subframe and/or Rx beam scanning subframe) may be very limited. Accordingly, system overhead may increase.

Accordingly, in a beam scanning subframe in which a process of searching for (or identifying) an optimal Tx/Rx beam pair is performed, a method configured based on transmission beam scanning/tracking duration N may be taken into consideration.

In this case, as described above, the reception beam scanning/tracking operation needs to be performed more frequently within the corresponding duration (i.e., transmission beam scanning/tracking duration).

For the reception beam scanning/tracking operation, the present invention proposes a method of transmitting, by a base station, information for a transmission beam indication to a terminal and obtaining, by the terminal, the information.

Specifically, the base station may use a transmission method of a signature (i.e., a preamble type) using a reference signal or a transmission method of a message type through a specific physical channel in order to transmit the information for the transmission beam indication.

First Embodiment

Figure 11:
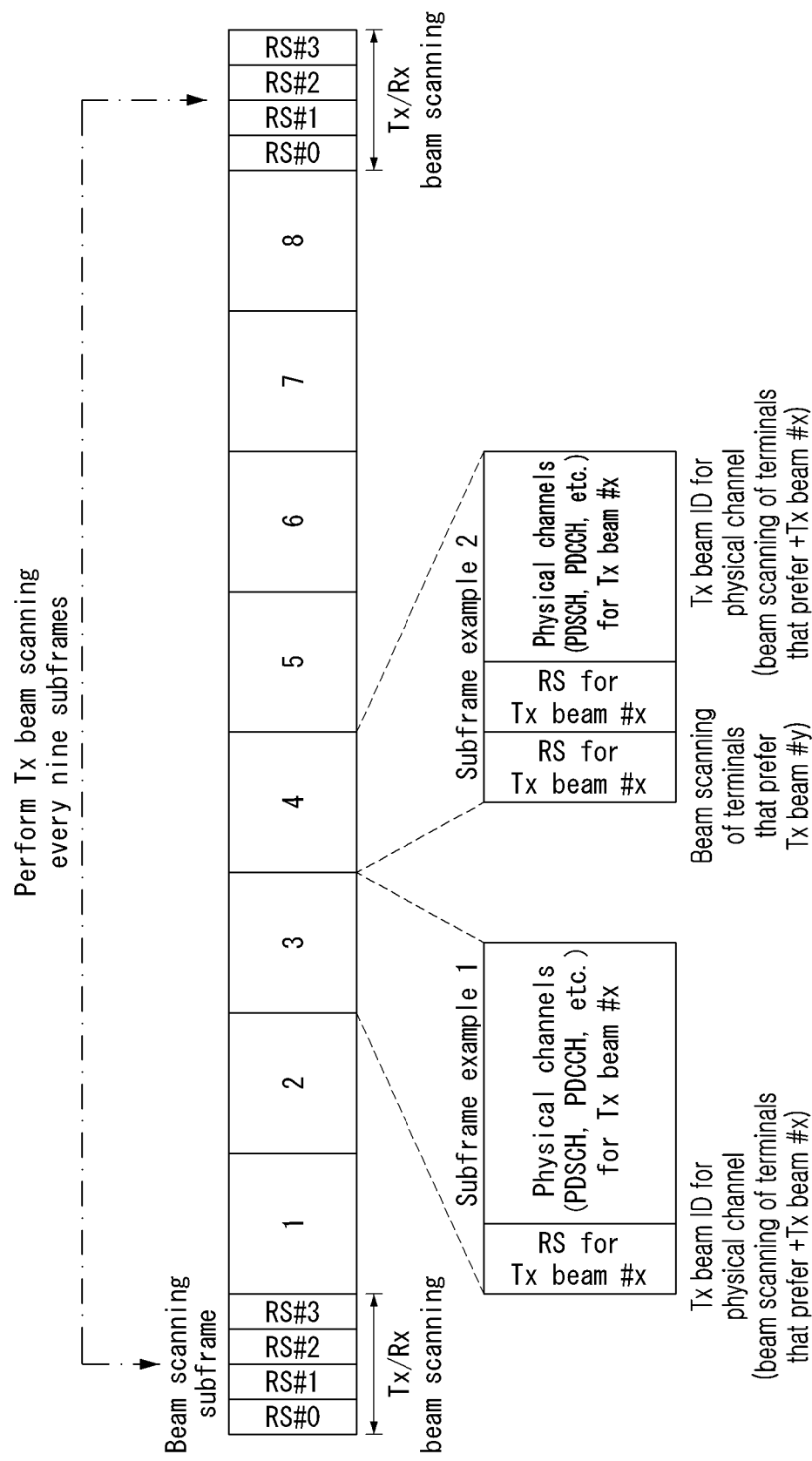
FIG. 11 shows an example of a frame structure including a preamble for providing indication information for a transmission beam according to an embodiment of the present disclosure.

In an embodiment of the present disclosure, a base station may transmit one or a plurality of preambles (e.g., reference signal, pilot signal) to be used for at least one of the following two objects during a specific time interval within a subframe.
 the identification of a transmission beam (or an indicator for a transmission beam) applied to a physical layer channel (e.g., PDSCH, PDCCH) transmitted in a corresponding subframe
 Reception beam scanning/tracking for a terminal that requires reception beam scanning/tracking within a shorter time compared to transmission beam scanning/tracking FIG. 11 shows an example of a frame structure including a preamble for providing indication information for a transmission beam according to an embodiment of the present disclosure. FIG. 11 is merely for convenience of description and does not limit the range of the present invention.

Referring to FIG. 11, a case where a base station performs a transmission beam scanning/tracking operation at 9 subframe intervals is assumed.

In this case, in a frame structure shown in FIG. 11, a beam scanning subframe may be configured because a subframe is configured with only a preamble(s) used for the object of reception beam scanning and/or transmission beam scanning.

Furthermore, a preamble may be used for various objects that may be performed as the existing reference signal (RS) in addition to the above-described two objects. For example, the preamble may be used for the estimation of channel state information for the downlink, the measurement of radio resource management (RRM), such as reference signal received power (RSRP)/reference signal received quality (RSRQ)/received signal strength indicator (RSSI) and/or a channel estimation object for physical channel demodulation transmitted in a corresponding subframe.

In this case, in order to improve efficiency of beamforming switching in the RF stage with respect to the configuration of a subframe proposed in the present disclosure, the preamble may be transmitted in initial K transmission symbols (i.e., symbols used for transmission) of the subframe.

In this case, the K value may include 0. When the K value is set to 0, a corresponding subframe may mean a subframe to which specific beamforming is not applied. Alternatively, to set the K value to 0 may mean that the preamble is not used for the object of the identification of a transmission beam applied to a physical layer channel transmitted in the corresponding subframe.

The K value may be forwarded using one method of the following examples.

For example, according to a dynamic adaptation method, the K value may be forwarded in a signature type through the sequence of a preamble first transmitted in a corresponding subframe.

For another example, according to the dynamic adaptation method, the K value may be forwarded in a signature type through each preamble sequence. More specifically, the signature may have been related to whether a preamble transmitted in a next symbol is present.

For another example, according to the dynamic adaptation method, a separate physical channel and/or signal used to notify the K value may be defined. In this case, a base station may deliver the K value to a terminal through the defined physical channel and/or signal.

For another example, according to a semi-static adaptation method, the K value may be forwarded through higher layer information. More specifically, a base station may transmit the K value to a terminal through higher layer signaling (e.g., radio resource control (RRC) signaling).

Furthermore, with respect to a preamble finally transmitted in a corresponding subframe among preambles proposed in the present disclosure, a method of applying the same transmission beam as a transmission beam to be applied to a physical channel (e.g., PDSCH, PDCCH) transmitted in the corresponding subframe may also be taken into consideration. However, in this case, it is a prerequisite that the preamble is used for the object of the identification of a transmission beam applied to a physical layer channel transmitted in a corresponding subframe.

In an embodiment of the present disclosure, if a proposed preamble signal is used for a reception beam scanning object (i.e., second object), the preamble signal may be transmitted through a plurality of symbols. For example, in FIG. 9, if one symbol is configured (or constructed) for one terminal reception beam, one preamble may be configured with a plurality of sub-preambles, that is, a plurality of symbols. In this case, the K value may mean the number of preambles or the number of sub-preambles.

In particular, as in a subframe example 2 shown in FIG. 11, a case where the preamble of a reception beam scanning object (i.e., an RS for a Tx beam #y shown in FIG. 11) and the preamble of a Tx beam identification object (i.e., an RS for a Tx beam #x shown in FIG. 11) are transmitted in the same subframe may be taken into consideration. In this case, the preamble of the reception beam scanning object may be configured with N symbols in which the length of a symbol is y millisecond (msec), and the preamble of the Tx beam identification object may be configured with symbols in which the length of a symbol is z msec. In this case, the N means the number of Rx candidate beams.

In this case, a method of designing the z as N×y (i.e., z=N×y) or a method of designing the z as y (z=y) is possible. In the latter case, the preamble of the reception beam scanning object length may be designed to be N times longer than the preamble of the transmission beam identification object.

A terminal may perform the following operation in accordance with the above-described preamble transmission operation of a base station.

A terminal that requires reception beam scanning/tracking within a time faster than that of transmission (Tx) beam scanning/tracking, among terminals whose reporting and/or setting for a preferred transmission beam has been completed, may identify whether a preamble (e.g., reference signal, pilot signal) corresponding to the preferred transmission beam has been transmitted every subframe. If a preamble corresponding to the preferred transmission beam is present through the identification, the terminal may perform a scanning/tracking operation on a reception beam in a subframe in which the preamble has been detected.

In this case, the preamble may have a structure in which a signal including beam identification (beam identifier, beam ID) information is early transmitted. In applying the technology proposed in the present invention, the reception beam scanning/tracking time of a terminal can be more secured as a beam identification is detected within a shorter time, thereby improving efficiency.

Accordingly, in the transmission of the preamble, after a signal containing beam identification information (e.g., a signal in which a beam identification is mapped to a sequence and configured in a signature type) is early transmitted, the preamble may be performed through a structure in which another signal to which the same Tx beamforming coefficient has been applied is transmitted.

Furthermore, a terminal having downlink data and/or control information to be received, among terminals whose reporting and/or setting for a preferred transmission beam has been completed, may identify whether a preamble (e.g., reference signal, pilot signal) corresponding to the preferred transmission beam has been transmitted every subframe. If a preamble corresponding to the preferred transmission beam is present through the identification, the terminal may identify (acquire or detect) downlink data and/or control information in a subframe in which the preamble has been detected. In this case, a terminal with which the preamble for the transmission beam is matched (i.e., a terminal that prefers the transmission beam) may additionally perform a scanning/tracking operation on a reception beam using the corresponding preamble.

Second Embodiment

Furthermore, in another embodiment of the present invention, a preamble (i.e., a signature type using a reference signal), such as that described above, and a message type through a specific physical channel may be used in order to transmit information for transmission beam indication. This may be similar to a case where in the legacy LTE system, control format indicator (CFI) information is transmitted through a physical control format indicator channel (PC-FICH).

In this case, the specific physical channel proposed in the present invention is transmitted through a symbol more positioned on the front side than a downlink control channel (physical control channel) (e.g., PDCCH) as in the above-proposed preamble.

The method of transmitting information on transmission beam indication, which is proposed in the present disclosure, that is, a method of indicating a transmission beam, may be used for the reception of a control channel and data channel by a terminal. However, if a beam used for the transmission of a data channel is different from a beam used for the transmission of a control channel, the method proposed in the present invention may be used for only a downlink control channel.

Third Embodiment

Furthermore, in yet another embodiment of the present disclosure, if a terminal uses a preamble (e.g., a reference signal) for transmitting transmission beam indication information or a plurality of beams in order to receive a physical channel, the preamble or the physical channel may be repetitively transmitted in a plurality of time domains/frequency domains. Accordingly, the terminal may be configured to receive the preamble or physical channel by applying different reception beams every plural time domains and/or frequency regions.

In this case, when the number of transmission candidate beams (i.e., beam preferred by a terminal) is many, overhead of a preamble or physical channel (i.e., channel resource) for the above-described dynamic beam identification may occur.

When this point is taken into consideration, a method of restricting (or proposing) the size of a candidate beam set to be indicated in a time unit (e.g., subframe of legacy LTE) in which downlink control information (DCI) may be transmitted to N bits and dynamically providing notification of a beam set to be used may be taken into consideration. In this case, some of beams included in the beam set may be included in a different beam set. For example, a beam #1, a beam #2, and a beam #3 may be included in a beam set #1, and a beam #2, a beam #3, and a beam #4 may be included in a beam set #2.

In this case, which beam set can be used for which time/frequency resource unit, by grouping all candidate beams into a plurality of beam sets may be previously designated according to a specific rule. Alternatively, a base station may transfer (or transmit) corresponding information to a terminal through signaling (e.g., signaling using an RRC message, signaling using a medium access control control element (MAC CE)).

Specifically, in order to configure a beam of a control channel, that is, to transfer (or transmit) transmission beam information for a control channel to the terminal, the base station may use signaling methods, such as the following examples.

For example, a base station may transfer (or transmit) transmission beam information for a control channel to a terminal through 1 level signaling. In this case, the configuration of a beam set needs to be configured by a predetermined rule. That is, a PDCCH Tx beam ID (e.g., CSI-RS resource ID) needs to be previously determined based on a slot and/or a physical resource block (PRB) index. In this case, the base station may notify the terminal of information for a transmission beam through dynamic beam indication based on downlink control information (DCI) and/or a downlink reference signal (DL RS). Alternatively, the base station may notify the terminal of information for a transmission beam through dynamic beam indication based on a MAC CE.

For another example, a base station may transfer (or transmit) transmission beam information for a control channel to a terminal through 2 level signaling. Specifically, the base station may transfer (or transmit) information on beam set configuration to the terminal through RRC signaling, and may perform dynamic beam indication on the terminal using DCI and/or a DL RS. Alternatively, the base station may transfer (or transmit) information on a beam set configuration to the terminal through RRC signaling, and may perform dynamic beam indication on the terminal using a MAC CE. Alternatively, the base station may transmit information on a beam set configuration to the terminal through a MAC CE, and may perform dynamic beam indication on the terminal using DCI and/or a DL RS.

For another example, a base station may transfer (or transmit) transmission beam information for a control channel to a terminal through 3 level signaling. Specifically, the base station may transmit higher configuration information of a beam set (i.e., beam super set configuration) to the terminal through RRC signaling, may transmit lower configuration information of a beam set (i.e., beam set configuration) within the super configuration information of the beam set to the terminal using a MAC CE, and may perform dynamic beam indication on the terminal using DCI and/or a DL RS. In other words, the base station may use RRC signaling for beam set configuration information of a wide range and use a MAC CE for beam set configuration information of a narrow range included in the wide range in order to transmit information on the configuration of a beam set to the terminal.

Figure 12:
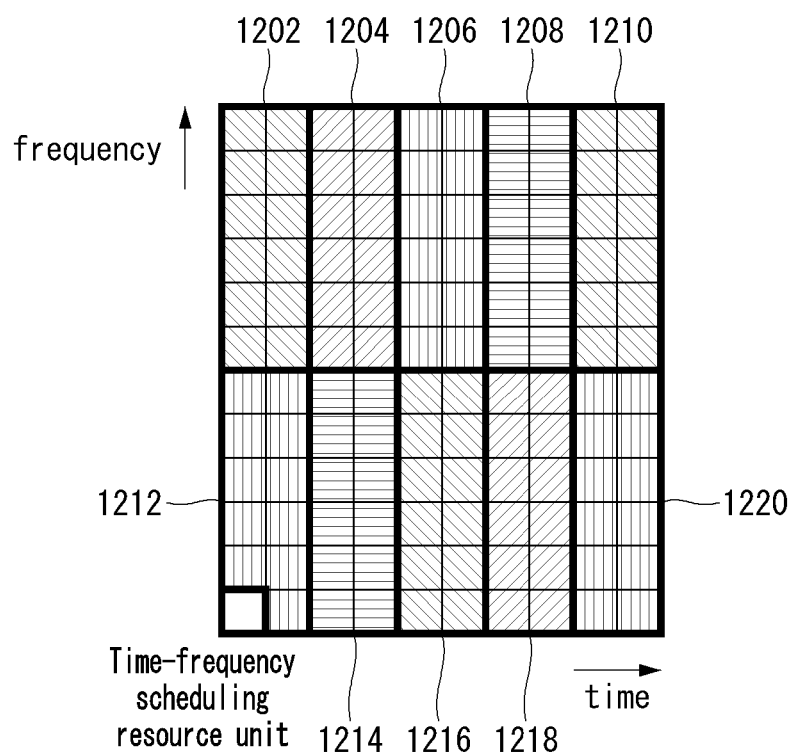
FIG. 12 shows an example of a Tx beam set-based resource region for a downlink control channel according to various embodiments of the present disclosure.

FIG. 12 shows an example of a Tx beam set-based resource region for a downlink control channel according to various embodiments of the present disclosure. FIG. 12 is merely for convenience of description and does not limit the range of the present invention.

Referring to FIG. 12, it is assumed that transmission beams of a base station are grouped into 4 transmission beam sets (i.e., a Tx beam set #1, a Tx beam set #2, a Tx beam set #3, and a Tx beam set #4). Furthermore, a time/frequency scheduling resource unit in FIG. 12 may be configured as a resource block (RB) (e.g., RB of legacy LTE).

In this case, the base station may determine a plurality of resource regions by splitting the resource region every 5 RBs in a frequency axis and every 2 subframes in a time axis, and may notify a terminal that which transmission beam of the base station can be used in a specific resource region. For example, the base station may transmit a control channel in a region 1202, a region 1210 and/or a region 1216 using a transmission beam set #1, may transmit a control channel in a region 1206, a region 1212 and/or the region 1220 using a transmission beam set #2, may transmit a control channel in a region 1204 and/or a region 1218 using a transmission beam set #3, and may transmit a control channel in a region 1208 and/or a region 1214 using a transmission beam set #4.

Accordingly, the terminal may limit a region in which a control channel will be monitored based on report information on a preferred beam of the base station and/or information on a serving beam(s) designated in the terminal by the base station. In this case, as described above, information for a beam used for each scheduling resource (e.g., RB) within each resource region may be dynamically signaled through a reference signal or a physical channel. In this case, the number of bits necessary for information forwarding can be minimized because information that requires signaling is limited to beams included in a corresponding beam set.

In the above-described method, a method of restricting the size of a transmission beam set of a base station to 1 (i.e., the number of beams included in a transmission beam set is 1) may also be taken into consideration. In other words, if a transmission beam of a base station to be used as a specific time/frequency resource unit is designated by a determined rule or signaling (e.g., RRC message, signaling based on a MAC CE), a terminal may perform detection on a control channel only in a corresponding resource based on beam report information or beam indication information of the base station. In this case, the detection may mean blind detection for a control channel (e.g., PDCCH). In this case, a dynamic Tx beam indication method using a reference signal or a specific physical channel, such as that described above, may not be applied.

Alternatively, a method of not applying a dynamic transmission beam indication method although the size of a transmission beam set of a base station is greater than 1 may also be taken into consideration. In this case, the base station may transmit a control channel using a plurality of beams included in a corresponding resource region. For example, if a control channel is transmitted using 2 orthogonal frequency division multiplexing (OFDM) symbols and the size of a transmission beam set is 2, the base station may transmit the control channel through a transmission method of alternately using two beams. Furthermore, the base station may transmit the control channel by applying different beams, included in a transmission beam set, to specific subcarrier sets in a frequency axis even within one symbol (i.e., OFDM symbol).

In the above-described method, if a terminal has a plurality of serving beams (e.g., if a plurality of preferred beams is reported to the base station or a plurality of beams is indicated by the base station), the terminal may perform blind detection in one or more PDCCH monitoring resource regions in which at least one beam of the plurality of serving beams is included.

Figure 13:
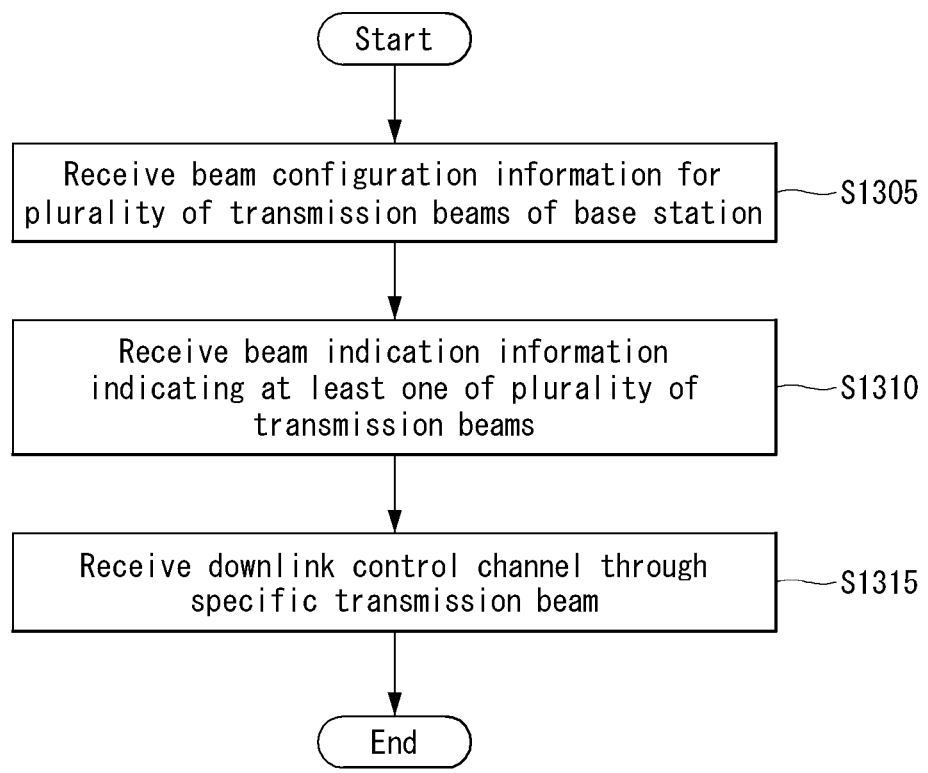
FIG. 13 shows an example of an operation flowchart of a terminal that receives a downlink channel according to various embodiments of the present disclosure.

FIG. 13 shows an example of an operation flowchart of a terminal that receives a downlink channel according to various embodiments of the present disclosure. FIG. 13 is merely for convenience of description and does not limit the range of the present invention.

Referring to FIG. 13, it is assumed that a base station and a terminal perform a beam scanning operation in order to identify the best beam pair. Furthermore, it is assumed that the base station and the terminal of FIG. 13 perform an operation according to the above-described embodiments of the present invention (e.g., the contents related to FIGS. 10 to 12).

At step S1305, the terminal receives, from the base station, beam configuration information for a plurality of transmission beams of the base station. In this case, the beam configuration information includes configuration information indicating one or more beam sets (e.g., at least one of a first beam set or a second beam set) of the plurality of transmission beams. For example, the beam configuration information may mean configuration information on the above-described beam set (or candidate beam set). A method of configuring and method of forwarding the beam configuration information have been described above.

For example, the one or more beam sets (e.g., the first beam set and the second beam set) may be configured in different resource regions in which a downlink control channel may be transmitted (e.g., FIG. 12). In this case, at least one of a time resource or a frequency resource may be differently configured for each resource region configured for the one or more beam sets. That is, at least one of a time resource or a frequency resource may be differently configured in the resource region configured in the first beam set compared to the resource region configured in the second beam set.

Furthermore, the size of the one or more beam sets may be determined based on a time unit in which downlink control information of a specific physical channel may be transmitted. Furthermore, the scheduling of the resource region configured in each of the one or more beam sets may be performed in a specific resource block unit.

After the terminal receives the beam configuration information, at step S1310, the terminal receives, from the base station, beam indication information indicating (or representing) at least one of the plurality of transmission beams of the base station. In this case, the beam indication information may mean information indicating (or representing) a specific beam set(s) of the above-described candidate beam sets (or information indicating (or representing) a specific beam within a specific beam set).

Thereafter, at step S1315, the terminal receives a downlink control channel through a specific transmission beam. In this case, the specific beam may mean a specific beam identified among the at least one transmission beam based on the beam configuration information and the beam indication information. In this case, the specific beam may be indicated through a specific preamble or a specific physical channel received in a symbol prior to a symbol in which the downlink control channel is received.

Furthermore, in various embodiments of the present disclosure, the beam configuration information and the beam indication information may be received through higher layer signaling as described above. Furthermore, the beam configuration information may be received through a radio resource control message, and the beam indication information may be received through a medium access control (MAC) control element (CE). Furthermore, the beam configuration information may be received through higher layer signaling, and the beam configuration information may be received through higher layer signaling.

Furthermore, in various embodiments of the present disclosure, a terminal may perform beam measurement on a plurality of transmission beams of the base station, and may report, to a base station, information for one or more of the plurality of transmission beams. In this case, the information for the one or more transmission beams may further include information for one or more reception beams of the terminal, corresponding to the one or more transmission beams. In this case, the reporting operation may be performed prior to the operation of receiving the beam indication information.

Fourth Embodiment

As described above, after designating a plurality of transmission beam set mapping schemes by a higher layer message (for example: an RRC message), it may be used a method of designating using a lower layer message (for example: MAC layer messages, physical layer messages, DCI, etc.) about using which mapping scheme. Here, the mapping schemes may mean a scheme of configuring a relationship between a transmission beam set and a predetermined resource region (that is, a resource set) configured for channel reception.

That is, the base station may transmit configuration information about a plurality of beam sets (i.e., beam sets comprised of a plurality of base station transmission beams) that have a mapping relationship with a plurality of specific resource sets (for example: each PDCCH resource region of FIG. 13) to the terminal through higher layer signaling. Thereafter, the base station may transmit information representing any one beam set of the plurality of beam sets to the terminal through lower layer signaling.

Through this, when the terminal receives the configuration information for the beam sets through higher layer signaling, the corresponding terminal may expect to receive the downlink channel (for example: PDCCH, PDSCH, etc.) later using the reception beam set of the terminal corresponding to the beam set indicated by the base station.

However, when the terminal receives the configuration information through the higher layer signaling, that is, the higher layer message, and then fails to receive information indicating any one beam set through the lower layer signaling, that is, the lower layer message, ambiguity may exist in beam selection (or beam set selection, resource set selection) for channel reception of the terminal.

Considering the above, when the terminal does not receive information indicating any one beam set of a plurality of beam sets configured for reception of the downlink channel, the present embodiment proposes a method for configuring the corresponding terminal to receive the downlink channel through a pre-configured beam set.

In the following description of the present embodiment, the pre-configured beam set may mean a predetermined beam set in order to solve beam selection ambiguity of the terminal. In this case, the pre-configured beam set may be referred to as a specific beam set, a default beam set, or a default mapping scheme.

The present embodiment will be described based on the case where the terminal receives the downlink control channel (for example: PDCCH), however, this is for convenience of explanation only, the method described in the present embodiment may be commonly applied to reception of another downlink channel (for example: PDSCH) and transmission of uplink channel (for example: PUCCH and/or PUSCH).

First, in case the terminal does not receive information indicating any one beam set through lower layer signaling, it may be considered a method of previously designating (or configuring) one beam set among the plurality of beam sets described above and including it in configuration information transmitted through higher layer signaling. That is, information representing the pre-configured beam set may be configured to be included in the configuration information transmitted through higher layer signaling.

For example, when a plurality of beam sets for receiving the downlink channel are configured through higher layer signaling, the base station may designate any one of the plurality of beam sets as the pre-configured beam set.

That is, when N transmission beam set mapping schemes are configured through higher layer signaling according to time resources, frequency resources, and/or spatial resources (for example: antenna ports), the base station may designate one of them as a specific beam set mapping scheme (for example: a default mapping scheme). In this case, a flag or the like may be used to designate the specific beam set mapping scheme.

Alternatively, in case the terminal does not receive information indicating one beam set through lower layer signaling, it may also be considered a method of pre-designating (on a system) a rule representing the pre-configured beam set among the plurality of beam sets described above.

For example, when there are a plurality of indexes representing a plurality of beam sets, a beam set corresponding to a specific sequence index (for example: a first index) may be designated as the pre-configured beam set.

That is, it may be considered a method of designating a specific sequence number (for example: a first) scheme among the N transmission beam set mapping schemes as the default mapping scheme.

When the pre-configured beam set is designated through the above-described methods, although the terminal does not receive information indicating any one beam set of the plurality of beam sets through the lower layer signaling, the corresponding terminal may receive (or monitor) the downlink channel (for example: PDCCH, PDSCH) using the pre-configured beam set (that is, a default mapping scheme).

In this case, the above-described configuration of the beam sets (that is, the configuration for the transmission beam set mapping scheme) may be indicated as the Quasi-co-location (QCL) relationship for a spatial parameter between reference signals. For example, the QCL relationship may be QCL information for a spatial parameter such as an Angle of Arrival (AOA) between antenna ports of the reference signal. Here, the QCL information for the spatial parameter may be referred to as spatial QCL information.

In this regard, in the NR system, not only the QCL parameters (i.e., delay, gain, Doppler-related QCL) used in the existing LTE system, but also the QCL parameters for the spatial parameters may be used to indicate the reception beam (i.e., the reception beam of the terminal).

In other words, in the above-described embodiments of the present disclosure, configurations for beam sets (i.e., transmission beam set mapping schemes) may be configured using QCL information based on the reference signal (or the antenna port of the reference signal).

Specifically, the configurations for the beam sets may be indicated as QCL information between the CSI-RS (or an antenna port of the CSI-RS) that can be considered as a downlink reference signal for beam management and PDCCH DMRS (or an antenna port of the PDCCH DMRS). Alternatively, the configurations for the beam sets may be indicated as QCL information between a synchronization signal (SS) block (or antenna port(s) of the SS block) and the PDCCH DMRS (or the antenna port of the PDCCH DMRS).

For reference, in the NR system, a synchronization signal and a PBCH may be transmitted by applying a different beam for each SS block, and the synchronization signal and a PBCH DMRS antenna port may be representative as antenna ports belonging to each SS block.

In addition, the PBCH DMRS antenna port index may be configured in common for a plurality of SS blocks. That is, the structure of the same DMRS RE location, sequence, etc. may be configured for the plurality of SS blocks. Accordingly, when indicating spatial QCL information with the PDCCH DMRS, with PBCH DMRS antenna port index, an indicator for the SS block and/or a cell ID of the corresponding SS block may also be indicated.

Figure 14:
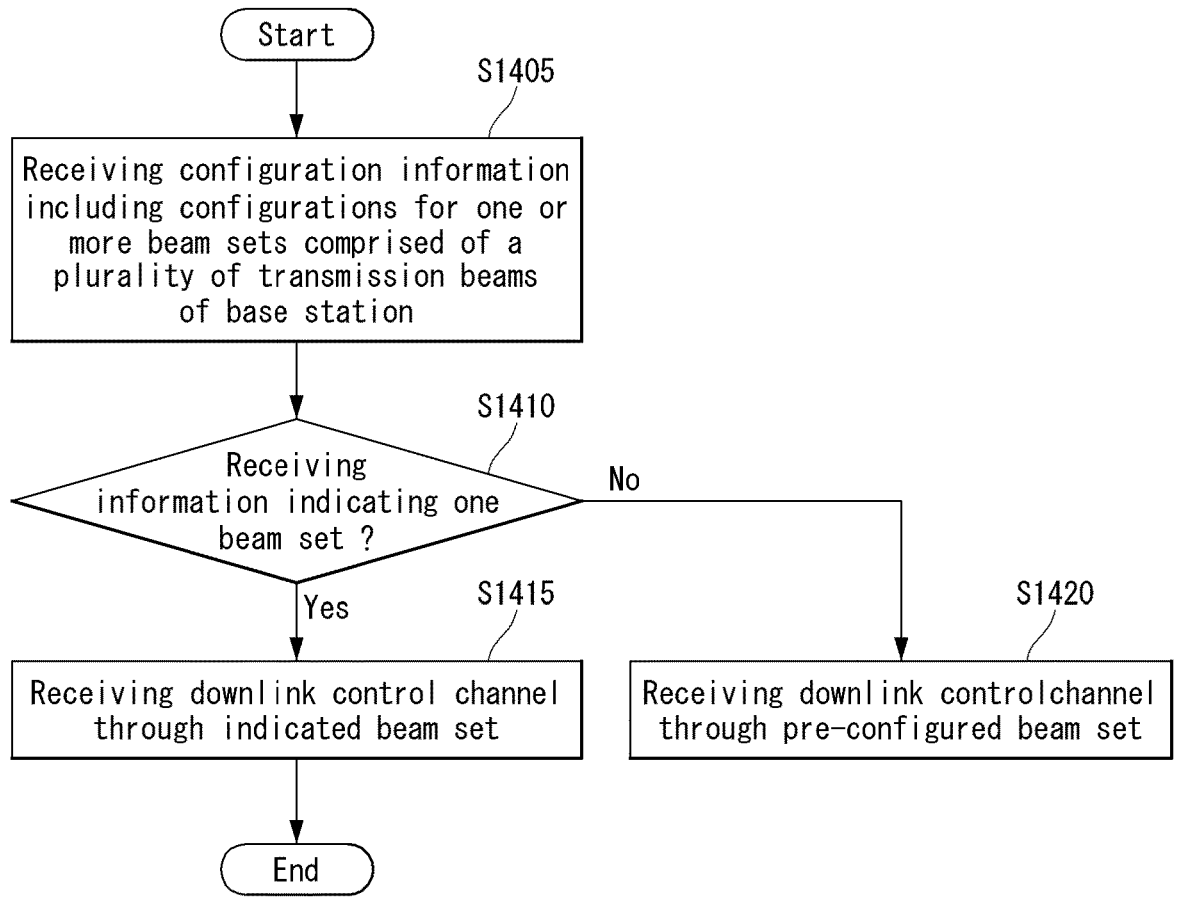
FIG. 14 shows another example of an operation flowchart of a terminal that receives a downlink channel according to various embodiments of the present disclosure.

FIG. 14 shows another example of an operation flowchart of a terminal that receives a downlink channel according to various embodiments of the present disclosure. FIG. 14 is merely for convenience of description and does not limit the scope of the present disclosure.

Referring to FIG. 14, it is assumed that a corresponding terminal receives a downlink control channel based on the method described in the fourth embodiment.

The terminal may receive, from a base station, configuration information for a plurality of transmission beams of the base station (step S1405). For example, the configuration information may be received through higher layer signaling (for example: radio resource control (RRC) layer signaling). In this case, the configuration information may include configurations for one or more beam sets comprised of the plurality of transmission beams.

The terminal may determine whether the terminal receives information indicating one beam set of the one or more beam sets (step S1410). For example, the information indicating one beam set may be received through Medium Access Control (MAC) layer signaling.

When the terminal receives the information indicating one beam set, the terminal may receive a downlink control channel through the indicated beam set (step S1415).

On the other hand, when the terminal does not receive the information indicating the one beam set, the terminal may receive the downlink control channel through a pre-configured beam set of the one or more beam sets.

In this case, the pre-configured beam set may be a beam set corresponding to a first index among one or more indices representing each of the one or more beam sets. Alternatively, information representing the pre-configured beam set may be included in the configuration information in step S1405.

Further, the configurations for one or more beam sets may be configured using Quasi-co-location (QCL) information based on an antenna port. In this case, the QCL information may be configured based on a QCL between a Channel State Information-Reference Signal (CSI-RS) and a Demodulation Reference Signal (DMRS) of the downlink control channel. Alternatively, the QCL information may be configured based on a QCL between a Synchronization Signal (SS) Block and a Demodulation Reference Signal (DMRS) of the downlink control channel.

In addition, as shown in FIG. 12, the one or more beam sets may be mapped to each of one or more resource sets configured for the downlink control channel.

Overview of Device to which the Present Invention May be Applied

Figure 15:
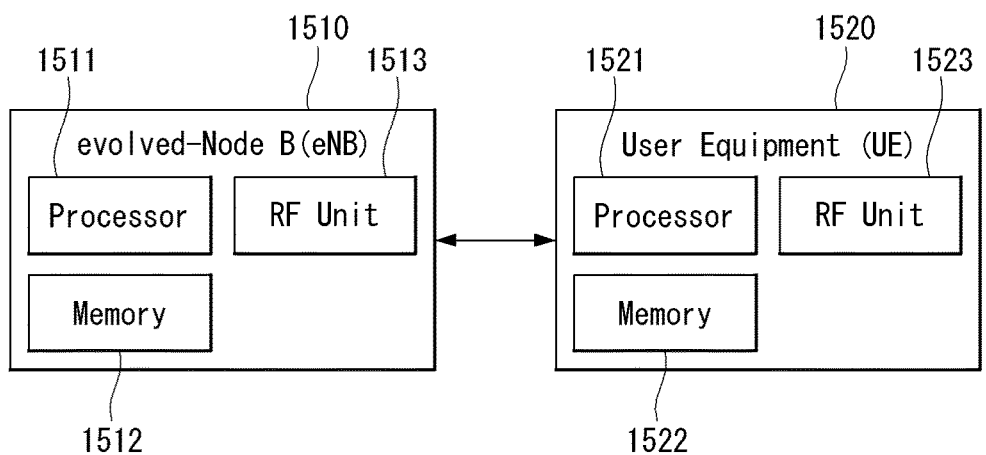
FIG. 15 illustrates a block diagram of a wireless communication device to which methods proposed in this specification may be applied.

FIG. 15 illustrates a block diagram of a wireless communication device to which methods proposed in this specification may be applied.

Referring to FIG. 15, a wireless communication system includes an eNB 1510 and a plurality of UEs 1520 disposed within the area of the eNB 1510.

The eNB 1510 includes a processor 1511, memory 1512 and a radio frequency (RF) unit 1513. The processor 1511 implements the functions, processes and/or methods proposed in FIGS. 1 to 14. The layers of a radio interface protocol may be implemented by the processor 1511. The memory 1512 is connected to the processor 1511 and stores a variety of pieces of information for driving the processor 1511. The RF unit 1513 is connected to the processor 1511 and transmits and/or receives radio signals.

The UE 1520 includes a processor 1521, memory 1522 and an RF unit 1523.

The processor 1521 implements the functions, processes and/or methods proposed in FIGS. 1 to 14. The layers of a radio interface protocol may be implemented by the processor 1521. The memory 1522 is connected to the processor 1521 and stores a variety of pieces of information for driving the processor 1521. The RF unit 1523 is connected to the processor 1521 and transmits and/or receives radio signals.

The memory 1512, 1522 may be positioned inside or outside the processor 1511, 1521 and may be connected to the processor 1511, 1521 by various well-known means.

For example, in a wireless communication system supporting low latency service, in order to transmit and receive downlink (DL) data, a UE may include a radio frequency (RF) unit for transmitting and receiving radio signals; and a processor functionally connected to the RF unit.

Furthermore, the eNB 1510 and/or the UE 1520 may have a single antenna or multiple antennas.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

A method for receiving a downlink channel in a wireless communication system of the present disclosure has been described based on an example in which the method is applied to the 3GPP LTE/LTE-A system and a 5G system (new RAT system), but may be applied to various wireless communication systems in addition to the 3GPP LTE/LTE-A system and the 5G system.

The invention claimed is:

1. A method of receiving a physical downlink control channel, PDCCH, by a terminal in a wireless communication system, the method comprising:
receiving, from a base station, configuration information via a radio resource control, RRC, signaling,
wherein associations between (i) a channel state information reference signal, CSI-RS, and antenna port of PDCCH demodulation reference signal, DM-RS, and (ii) a synchronization signal, SS, block and the antenna port of PDCCH DM-RS are configured based on the configuration information;
receiving, from the base station, information for a specific association among the associations, via Medium Access Control-Control Element, MAC-CE, signaling; and
receiving, from the base station, the PDCCH based on the specific association,
wherein based on that the information for the specific association via MAC-CE signaling is not received, a pre-determined association is used as the specific association.

2. The method of claim 1, wherein each of the associations includes Quasi-co-location, QCL, information between (i) the CSI-RS and the antenna port of PDCCH DM-RS or (ii) the SS block and the antenna port of PDCCH DM-RS.

3. The method of claim 2, wherein based on the specific association including the QCL information between (ii) the SS block and the antenna port of PDCCH DM-RS, an identifier of the SS block is indicated based on the QCL information.

4. The method of claim 1,
wherein the PDCCH is received based on a resource set associated with the specific association.

5. A terminal for receiving a physical downlink control channel, PDCCH, in a wireless communication system comprising:

a transceiver for transmitting and receiving a radio signal, and a processor functionally connected to the transceiver, wherein the processor is configured to control to:

receive, from a base station, configuration information, via a radio resource control, RRC, signaling, wherein associations between (i) a channel state information reference signal, CSI-RS, and antenna port of PDCCH demodulation reference signal, DM-RS, and (ii) a synchronization signal, SS, block and the antenna port of PDCCH DM-RS are configured based on the configuration information;

receive, from the base station, information for a specific association among the associations, via Medium Access Control-Control Element, MAC-CE, signaling; and receive, from the base station, the PDCCH based on the specific association, wherein based on that the information for the specific association via MAC-CE signaling is not received, a pre-determined association is used as the specific association.

6. A method of transmitting a physical downlink control channel, PDCCH, by a base station in a wireless communication system, the method comprising:

transmitting, to a terminal, configuration information, via a radio resource control, RRC, signaling, wherein associations between (i) a channel state information reference signal, CSI-RS, and antenna port of PDCCH demodulation reference signal, DM-RS, and (ii) a synchronization signal, SS, block and the antenna port of PDCCH DM-RS are configured based on the configuration information;

transmitting, to the terminal, information indicating fora specific association among the associations, via Medium Access Control-Control Element, MAC-CE, signaling; and transmitting, to the terminal, the PDCCH based on the specific association, wherein based on that the information for the specific association via MAC-CE signaling is not received, a pre-determined association is used as the specific association.

* * * * *